(12) United States Patent
Mancini et al.

(10) Patent No.: US 11,269,103 B2
(45) Date of Patent: Mar. 8, 2022

(54) AUTONOMOUS DATA ACQUISITION SYSTEM AND METHOD

(71) Applicant: Blue Ocean Seismic Services Limited, Farnborough (GB)

(72) Inventors: Fabio Mancini, Wembley Downs (AU); Ben Hollings, Claremont (AU)

(73) Assignee: Blue Ocean Seismic Services Limited, Farnborough (GB)

(*) Notice: Subject to any disclaimer, the term of this patent is extended or adjusted under 35 U.S.C. 154(b) by 0 days.

(21) Appl. No.: 17/100,306

(22) Filed: Nov. 20, 2020

(65) Prior Publication Data

US 2021/0088687 A1 Mar. 25, 2021

Related U.S. Application Data

(63) Continuation of application No. PCT/AU2019/050508, filed on May 23, 2019.

(30) Foreign Application Priority Data

May 23, 2018 (AU) .................. 2018901806

(51) Int. Cl.

| G01V 1/38 | (2006.01) |
|---|---|
| B63G 8/00 | (2006.01) |
| B63G 8/22 | (2006.01) |
| B63G 8/24 | (2006.01) |
| G01V 1/20 | (2006.01) |

(52) U.S. Cl.
CPC .......... *G01V 1/3852* (2013.01); *B63G 8/001* (2013.01); *B63G 8/22* (2013.01); *B63G 8/24* (2013.01); *G01V 1/3808* (2013.01); *G01V 1/3835* (2013.01); *B63B 2207/02* (2013.01); *B63G 2008/004* (2013.01); *G01V 2001/207* (2013.01)

(58) Field of Classification Search
CPC .. G01V 1/3852; G01V 1/3808; G01V 1/3835; G01V 2001/207; B63G 8/001; B63G 8/22; B63G 8/24; B63G 2008/004; B63B 2207/02
See application file for complete search history.

(56) References Cited

U.S. PATENT DOCUMENTS

| 6,474,254 | B1 | 11/2002 | Ambs et al. |
|---|---|---|---|
| 6,588,980 | B2 | 7/2003 | Worman et al. |
| 6,625,083 | B2 | 9/2003 | Vandenbroucke |
| 6,657,921 | B1 | 12/2003 | Ambs |
| 6,796,261 | B2 | 9/2004 | Colyer |

(Continued)

FOREIGN PATENT DOCUMENTS

| AU | 2005244529 B2 | 10/2007 |
|---|---|---|
| AU | 2015210352 A1 | 10/2015 |

(Continued)

*Primary Examiner* — Ian J Lobo
(74) *Attorney, Agent, or Firm* — EIP US LLP

(57) ABSTRACT

A submersible node and a method and system for using the node to acquire data, including seismic data is disclosed. The node incorporates a buoyancy system to provide propulsion for the node between respective landed locations by varying the buoyancy between positive and negative. A first acoustic positioning system is used to facilitate positioning of a node when landing and a second acoustic positioning system is used to facilitate a node transiting between respective target landed locations.

18 Claims, 10 Drawing Sheets

(56) References Cited

U.S. PATENT DOCUMENTS

| | | |
|---|---|---|
| 6,846,133 B2 | 1/2005 | Martin et al. |
| 6,932,185 B2 | 8/2005 | Bary et al. |
| 6,951,138 B1 | 10/2005 | Jones |
| 6,975,560 B2 | 12/2005 | Berg et al. |
| 6,992,951 B2 | 1/2006 | O'Brien et al. |
| 7,016,260 B2 | 3/2006 | Bary |
| 7,210,556 B2 | 5/2007 | Bath et al. |
| 7,224,641 B2 | 5/2007 | Maes |
| 7,324,406 B2 | 1/2008 | Berg |
| 7,632,043 B2 | 12/2009 | Thompson et al. |
| 7,646,670 B2 | 1/2010 | Maxwell et al. |
| 7,675,821 B2 | 3/2010 | Berg et al. |
| 7,796,466 B2 | 9/2010 | Combee et al. |
| 7,965,583 B2 | 6/2011 | Thomas |
| 8,355,295 B1 | 1/2013 | Smallin |
| 8,534,959 B2 | 9/2013 | Thompson et al. |
| 8,579,545 B2 | 11/2013 | Jewell et al. |
| 8,717,844 B2 | 5/2014 | Welker et al. |
| 8,840,340 B2 | 9/2014 | Eisenhower et al. |
| 8,867,311 B2 | 10/2014 | Rikoski |
| 8,881,665 B2 | 11/2014 | Brizard et al. |
| 8,893,637 B2 | 11/2014 | Roger et al. |
| 8,995,222 B2 | 3/2015 | Xia et al. |
| 9,013,952 B2 | 4/2015 | Muyzert et al. |
| 9,052,380 B2 | 6/2015 | Winter et al. |
| 9,063,249 B2 | 6/2015 | Pearce et al. |
| 9,081,119 B2 | 7/2015 | Norris et al. |
| 9,090,319 B2 * | 7/2015 | Brizard ............... G01V 1/3843 |
| 9,121,969 B2 | 9/2015 | Rigsby et al. |
| 9,140,383 B2 | 9/2015 | Oldervoll |
| 9,140,814 B2 | 9/2015 | Welker et al. |
| 9,151,857 B2 | 10/2015 | Manin et al. |
| 9,316,333 B2 | 4/2016 | Duboue et al. |
| 9,329,286 B2 | 5/2016 | Jones et al. |
| 9,329,293 B2 | 5/2016 | Parkes et al. |
| 9,381,984 B2 | 7/2016 | Tjøm |
| 9,381,986 B2 * | 7/2016 | Brizard ............... B63B 21/26 |
| 9,383,471 B2 | 7/2016 | Tamanaja |
| 9,405,533 B2 | 8/2016 | Bouzas et al. |
| 9,417,351 B2 | 8/2016 | Brizard |
| 9,429,671 B2 | 8/2016 | Rokkan et al. |
| 9,432,129 B2 | 8/2016 | Gosling |
| 9,448,311 B2 | 9/2016 | Maxwell |
| 9,457,879 B2 | 10/2016 | Brizard |
| 9,459,363 B2 | 10/2016 | Tenghamn |
| 9,459,366 B2 | 10/2016 | Henman et al. |
| 9,469,382 B2 | 10/2016 | Lelaurin et al. |
| 9,470,812 B2 | 10/2016 | Couesnon et al. |
| 9,494,700 B2 | 11/2016 | Henman et al. |
| 9,523,780 B2 | 12/2016 | Naes et al. |
| 9,557,428 B2 | 1/2017 | L'Her |
| 9,625,597 B2 | 4/2017 | Grimsdale |
| 9,645,272 B2 | 5/2017 | Crowell |
| 9,684,085 B2 | 6/2017 | Grion et al. |
| 9,694,885 B2 | 7/2017 | Combee |
| 9,702,991 B2 | 7/2017 | Dellinger et al. |
| 9,733,378 B2 | 8/2017 | Carcaterra et al. |
| 9,746,569 B2 | 8/2017 | Sallas et al. |
| 9,753,169 B2 | 9/2017 | Jewell |
| 9,765,754 B2 | 9/2017 | Carcaterra et al. |
| 9,768,626 B2 | 9/2017 | Henman et al. |
| 9,817,143 B2 | 11/2017 | Van Groenestijn |
| 9,845,137 B2 | 12/2017 | Lelaurin et al. |
| 9,849,953 B2 | 12/2017 | Brizard |
| 9,857,490 B2 | 1/2018 | Martinez |
| 9,873,494 B2 | 1/2018 | Jewell |
| 9,891,333 B2 | 2/2018 | Valsvik et al. |
| 9,969,470 B2 | 5/2018 | Brizard et al. |
| 9,983,324 B2 | 5/2018 | Brenders et al. |
| 10,001,576 B2 | 6/2018 | Greenie et al. |
| 10,017,232 B2 | 7/2018 | Lelaurin |
| 10,018,742 B2 | 7/2018 | Fyffe et al. |
| 10,024,990 B2 | 7/2018 | Lambert |
| 10,042,068 B2 | 8/2018 | Woodward et al. |
| 10,054,706 B2 | 8/2018 | Noss |
| 10,099,760 B2 | 10/2018 | Rokkan et al. |
| 10,107,927 B2 | 10/2018 | Alkhatib |
| 10,114,137 B2 | 10/2018 | Fyffe et al. |
| 10,135,290 B2 | 11/2018 | Isfeldt |
| 10,151,848 B2 | 12/2018 | Fyffe et al. |
| 10,171,181 B2 | 1/2019 | Hopewell et al. |
| 10,191,170 B2 | 1/2019 | Muijzert et al. |
| 10,191,172 B2 | 1/2019 | Lovheim et al. |
| 10,209,382 B2 | 2/2019 | McMillan et al. |
| 10,234,579 B2 | 3/2019 | Marc et al. |
| 10,270,541 B2 | 4/2019 | Morris et al. |
| 10,274,624 B2 | 4/2019 | Udengaard |
| 10,310,125 B2 | 4/2019 | Siliqi et al. |
| 10,281,602 B2 | 5/2019 | Moldovenanu et al. |
| 10,281,605 B2 | 5/2019 | Muyzert et al. |
| 10,281,929 B2 | 5/2019 | Ibn Seddik |
| 10,286,981 B2 | 5/2019 | Gagliardi et al. |
| 10,288,750 B2 | 5/2019 | Hovland et al. |
| 10,288,756 B2 | 5/2019 | Fyffe et al. |
| 10,322,783 B2 | 6/2019 | Valsvik et al. |
| 10,345,462 B2 | 7/2019 | Rokkan et al. |
| 10,345,473 B2 | 7/2019 | Hine |
| 10,359,528 B2 | 9/2019 | Van Borselen et al. |
| 10,274,627 B2 | 10/2019 | Stewart et al. |
| 2004/0100865 A1 | 5/2004 | Tenghamn |
| 2009/0238647 A1 | 9/2009 | Delfino et al. |
| 2010/0185348 A1 | 7/2010 | Webb |
| 2010/0195434 A1 | 8/2010 | Menger et al. |
| 2010/0226203 A1 | 9/2010 | Buttle et al. |
| 2010/0302900 A1 | 12/2010 | Tenghamn |
| 2011/0032794 A1 | 2/2011 | Rhodes et al. |
| 2011/0116343 A1 | 5/2011 | Groenaas et al. |
| 2011/0205839 A1 | 8/2011 | Suedow et al. |
| 2011/0292760 A1 | 12/2011 | Hayes |
| 2012/0289103 A1 * | 11/2012 | Hudson ............... F42B 19/01 440/38 |
| 2013/0046472 A1 | 2/2013 | Cantillo |
| 2013/0070565 A1 | 3/2013 | Eisenhower et al. |
| 2013/0083622 A1 | 4/2013 | Hermann et al. |
| 2013/0083624 A1 | 4/2013 | Brizard et al. |
| 2014/0086008 A1 | 3/2014 | Pharris et al. |
| 2014/0140171 A1 | 5/2014 | Sollner |
| 2014/0226440 A1 | 8/2014 | Gosling |
| 2014/0251199 A1 | 9/2014 | Brizard et al. |
| 2014/0290554 A1 * | 10/2014 | Brizard ............... G01V 1/3852 114/331 |
| 2014/0301161 A1 | 10/2014 | Brizard et al. |
| 2014/0321238 A1 | 10/2014 | Winfield |
| 2014/0362661 A1 | 12/2014 | Mujizert et al. |
| 2015/0003194 A1 | 1/2015 | Brizard |
| 2015/0009780 A1 | 1/2015 | Rommel |
| 2015/0063064 A1 | 3/2015 | Van Groenestjin |
| 2015/0109883 A1 | 4/2015 | Vangasse et al. |
| 2015/0015819 A1 | 6/2015 | Tjom |
| 2015/0151819 A1 * | 6/2015 | Tjom ............... B63G 8/001 114/321 |
| 2015/0276959 A1 * | 10/2015 | Grimsdale ............ G01V 1/3808 701/21 |
| 2015/0316675 A1 | 11/2015 | Brizard et al. |
| 2015/0336645 A1 | 11/2015 | Brizard et al. |
| 2015/0377852 A1 | 12/2015 | Hartland |
| 2016/0094298 A1 | 3/2016 | Isfeldt et al. |
| 2016/0170060 A1 | 6/2016 | Hopewell et al. |
| 2016/0274259 A1 | 9/2016 | Daniel |
| 2016/0349386 A1 | 12/2016 | Naes |
| 2016/0349394 A1 | 12/2016 | Lecerf et al. |
| 2017/0023688 A1 | 1/2017 | Schenider |
| 2017/0026135 A1 * | 1/2017 | Cahalan ............... H04B 11/00 |
| 2017/0059729 A1 | 3/2017 | Eick et al. |
| 2017/0137098 A1 | 5/2017 | Valsvik et al. |
| 2017/0240257 A1 | 8/2017 | Brandt et al. |
| 2017/0242144 A1 | 8/2017 | Brizard |
| 2017/0248722 A1 | 8/2017 | Olivier |
| 2017/0371071 A1 | 12/2017 | Moulinier et al. |
| 2018/0003834 A1 | 1/2018 | Tenghamn |
| 2018/0003836 A1 | 1/2018 | Morris et al. |
| 2018/0052246 A1 | 2/2018 | Hartland |
| 2018/0052247 A1 | 2/2018 | Daniel et al. |
| 2018/0057114 A1 | 3/2018 | Hartland |

(56) References Cited

U.S. PATENT DOCUMENTS

| | | |
|---|---|---|
| 2018/0120462 A1 | 5/2018 | Hovland et al. |
| 2018/0162503 A1 | 6/2018 | Reid et al. |
| 2018/0222560 A1 | 8/2018 | Postic et al. |
| 2018/0224568 A1 | 8/2018 | Brizard |
| 2018/0252831 A1 | 9/2018 | Hartland et al. |
| 2018/0259665 A1 | 9/2018 | Landais et al. |
| 2018/0259666 A1 | 9/2018 | Siliqi et al. |
| 2018/0267188 A1 | 9/2018 | Turquais et al. |
| 2018/0275298 A1 | 9/2018 | Berg |
| 2018/0297678 A1 | 10/2018 | Grant et al. |
| 2018/0304977 A1 | 10/2018 | Grant et al. |
| 2018/0319463 A1 | 11/2018 | Grant et al. |
| 2018/0335537 A1 | 11/2018 | Goujon |
| 2018/0346082 A1 | 12/2018 | Smith et al. |
| 2018/0356550 A1 | 12/2018 | Morris et al. |
| 2019/0146110 A1 | 5/2019 | Hovland et al. |
| 2019/0233070 A1 | 8/2019 | Hartland |
| 2019/0250306 A1 | 8/2019 | Craft et al. |
| 2021/0018635 A1* | 1/2021 | Greffet ................ G01V 1/135 |

FOREIGN PATENT DOCUMENTS

| | | |
|---|---|---|
| CA | 2887400 C | 1/2019 |
| CN | 207636780 U | 7/2018 |
| EP | 0154968 A2 | 9/1985 |
| GB | 2503692 B | 10/2015 |
| GB | 2541189 A | 2/2017 |
| GB | 2531799 B | 5/2018 |
| WO | 2003005062 A1 | 1/2003 |
| WO | 2003056132 A1 | 7/2003 |
| WO | 2006024956 A1 | 3/2006 |
| WO | 2006041438 A1 | 4/2006 |
| WO | 2007040411 A1 | 4/2007 |
| WO | 2012041844 A1 | 4/2012 |
| WO | 2012085590 A2 | 6/2012 |
| WO | 2012110096 A1 | 8/2012 |
| WO | 2015082010 A1 | 6/2015 |
| WO | 2015092342 A1 | 6/2015 |
| WO | 2017221070 A1 | 12/2017 |
| WO | 2018015813 A1 | 1/2018 |
| WO | 2018089382 A1 | 5/2018 |
| WO | 2018109462 A1 | 6/2018 |
| WO | 2018131997 A1 | 7/2018 |
| WO | 2018178913 A1 | 10/2018 |
| WO | 2018200305 A1 | 11/2018 |
| WO | 2018204084 A1 | 11/2018 |
| WO | 2019105510 A1 | 6/2019 |
| WO | 2019127748 A1 | 7/2019 |
| WO | 2019139482 A1 | 7/2019 |

* cited by examiner

AUTONOMOUS DATA ACQUISITION SYSTEM AND METHOD

CROSS-REFERENCE TO RELATED APPLICATIONS

This application is a continuation of International Application No. PCT/AU2019/050508, filed May 23, 2019, which claims priority to AU Application No. AU 2018901806, filed May 23, 2018, under 35 U.S.C. § 119(a). Each of the above-referenced patent applications is incorporated by reference in its entirety.

BACKGROUND OF THE INVENTION

Technical Field

An autonomous data acquisition node, system and method are disclosed. The data may be marine or more particularly submarine data, including but not limited to one or more of seismic data and other data.

Description of the Related Technology

The genesis of the disclosed node, system and method stems from considering the quality and cost of acquiring marine seismic data. The acquisition of marine seismic data (also known as marine seismic surveying) is a critical initial phase in the exploration of offshore energy or mineral reserves.

One marine seismic surveying technique involves the use of a marine survey vessel to tow a seismic source and sensors through a body of water over a survey area whilst actuating the seismic source at selected intervals of time. The seismic source generates seismic waves which travel through the body of water and the subsurface generating reflection and refractions at interfaces associated with geological layers and formations. The reflected waves are detected by the sensors being towed by the vessel. Thus, there is a hydraulic coupling of the seismic energy from the seabed and underlying geology to the sensors.

In an alternate technique, seismic sensors are physically laid on the seabed to detect seismic energy which emanated from a controlled source and is subsequently reflected by the seabed and underlying geology. In this method there is a mechanical coupling of the seismic energy propagating through the seabed.

The mechanical coupling of sensors provides better quality data than hydraulic coupling. However, a drawback with the mechanical coupling is the difficulty and thus cost of placing and positioning the sensors on the seabed and subsequently moving them multiple times to cover a designated survey area. This is much easier and cheaper when sensor streamers are towed behind a vessel and reside in or near the water plane.

GB2541189 (Autonomous Robotics Limited) describes an autonomous underwater vehicle (AUV) that can be used for recording seismic signals during a marine seismic survey. The AUV is described as having a passive buoyancy system where a bladder holds a gas which is compressed by hydrostatic pressure as the AUV descends under the power of a thruster. Therefore, there is no ability to actively control or vary the buoyancy of the AUV. A propeller or thruster is used to both drive the AUV to the seafloor and also for recovery from the seafloor.

This specification is totally silent on the issues of navigation of the AUV and acoustic communication between the AUV and surface vehicles.

U.S. Pat. No. 9,417,351B2 (CGG Services SA) describes a system and method for conducting marine seismic surveys. This uses two clusters of AUVs each associated with an unmanned surface vessel (USV) to conduct marine survey. The USV follow paths independent of each other. A central control vessel controls the USVs. The AUV do not land on the seabed to acquire seismic data, rather they acquire their data while travelling through the water. This document does mention that an AUV can be "parked" on the ocean bottom if its depth is no more than a few hundred metres and the ocean bottom currents are not too strong. Then when a new survey needs to be performed the AUV may be awakened by a corresponding USV. The awakened AUV then operated in all manner to acquire data while in transit through the water rather than when on the seabed.

This document describes the use of an acoustic underwater positioning and navigation system installed on the USVs to communicate with the AUVs. This uses super Short Baseline (SSBL) or Ultra Short Baseline (USBL) communication. Each UV also described as optionally having a Wi-Fi communication system. This is to enable data transfer between an AUV and USV, and also for the purposes of obstacle avoidance.

U.S. Pat. No. 6,951,138B1 (Jones) describes a multi component ocean bottom seismometer (MOBS) that can be deployed from a vessel and swim to a location on the seabed to acquire seismic data, then either swim back to the vessel or to a second location on the seabed. The MOBS uses fins to dig into sea bottom to improve coupling. The fins also form part of a propulsion system that may optionally also include one or more propellers.

The MOBS a buoyancy system which essentially comprises a fixed volume ballast tank 41 they can be emptied or filled to provide a required buoyancy.

The MOBSs can swim to a new survey location after a completed survey. The navigation is provided by acoustic transponders 46, 50, 52 that must be installed on the seabed prior to commencing a survey. While the surface support ship 48, MOBSs and seabed acoustic transponders to a navigation system can communicate with each other this document does not describe any particular method of acoustic communications.

US2013/0083624A1 (CGGVERITAS Services SA) describes a system and method for conducting marine seismic surveys similar to that in U.S. Pat. No. 9,417,351B2, except that the AUVs navigate to the seabed where they acquire seismic data. The buoyancy system 134 and this document has a number of chambers that can be flooded with water to modify the buoyancy of the AUV. Is further disclosed that an accumulative holding compressed gas can be provided on the AUV to expel water from the chambers. The communications system is very rudimentary and limited, essentially mimicking that in U.S. Pat. No. 9,417, 351B2.

US2017/0137098A1 (Seabed Geosolutions BV) describes an AUV for acquiring seismic data from the seabed. A buoyancy control system 134 is provided for controlling the AUV depth. The ability to vary the buoyancy is described at [0035] by releasing a degradable weight on the bottom of the ocean. The possibility of one or buoyancy tanks that can be flooded with air or water to assist in vertical navigation is also described.

The AUVs in this specification can communicate with other subsea devices or a surface vessel using USBL, SSBL or SBL (short base length) systems.

Any discussion of the background art throughout this specification should in no way be considered as an admission that such background art is prior art, nor that such background art is widely known or forms part of the common general knowledge in the field in Australia or worldwide.

While the above background is cast in relation to marine seismic surveying, embodiments of the disclosed method, system and nodes are not limited in application to acquisition of seismic data and may alternately or additionally sense or measure other characteristics or physical attributes including but are not limited to: water temperature, density, chemical characteristics such as salinity, pH, oxygen content, carbon dioxide content, phosphate content; sulphur content; oceanographic conditions including ocean current velocity and hydrostatic pressure; gravitational field strength; magnetic field strength and orientation; gamma radiation; acoustic characteristics; optical characteristics; bathymetry; and aspects of the benthic zone.

SUMMARY

In one aspect there is disclosed a submersible autonomous data acquisition node comprising:
  buoyancy system enabling variation of the node buoyancy between positive buoyancy and negative buoyancy, the buoyancy system including at least one inflatable external bladder and at least one internal reservoir containing a liquid wherein the liquid can be transferred between the at least one inflatable external bladder and the internal reservoir to vary node buoyancy by changing total displacement of the node.

In one embodiment the buoyancy system is operable as a buoyancy propulsion system enabling the node to transit between two submarine locations, wherein the buoyancy system is arranged to vary node buoyancy between a positive buoyancy and a negative buoyancy to maintain the node within a transit envelope below the water surface and above a seabed to facilitate the node traversing along an oscillating path from a first submarine location to a second submarine location.

In one embodiment the submarine locations are landed locations on the seabed and wherein the buoyancy system is operable upon the node landing at a seabed location to increase the negative buoyancy of the node to thereby increase contact pressure between the node and the seabed.

In one embodiment the node is configured when landed on the seabed in manner wherein the negative buoyancy of the node is substantially evenly distributed over contact locations between the node and the seabed.

In one embodiment the buoyancy system comprises a pump system having at least one pump operable to transfer liquid from the reservoir to the at least one inflatable external bladder to thereby increase total node buoyancy, and a bleed path operable to selectively allow the liquid to flow from the at least one inflatable external bladder to the reservoir by action of a difference in pressure acting on liquid in the reservoir and in the at least one inflatable external bladder, to thereby decrease total node buoyancy.

In one embodiment the reservoir includes a pneumatic region separated from a hydraulic region containing the liquid, and wherein the pneumatic region is at a negative pressure with respect to atmospheric or hydrostatic pressure acting on the at least one inflatable external bladder.

In one embodiment the bleed path includes a one-way valve operable to enable fluid to flow only in a direction from the at least one external inflatable bladder to the reservoir, the valve being switchable between an opened state wherein liquid is able to flow from the at least one external inflatable bladder to the reservoir, and a closed state in which the liquid is blocked from flowing through the bleed path.

In one embodiment the pump system comprises a single pump capable of pumping liquid from the reservoir to the at least one inflatable external bladder.

In one embodiment the pump system comprises a transit pump and a lift-off pump, wherein the transit pump is arranged to pump liquid between the reservoir and the bladder at a first flow rate and first pressure, and the lander buoyancy system comprises a lander pump which pumps liquid between the reservoir and the bladder and a second flow rate and second pressure wherein the first flow rate is higher than the second flow rate and the second pressure is higher than the first pressure.

In one embodiment the node is selectively operable to broadcast acoustic communications packets to facilitate; and capable of receiving and processing acoustic communications packets to facilitate one-way travel time positioning when the node is repositioning between two submarine locations.

In one embodiment the node comprises a top mounted transducer for broadcasting the acoustic communications packets and a downward facing receiver for receiving acoustic communications packets transmitted by another node.

In one embodiment the node is arranged to communicate with a surface marine vessel using USBL, SBL or SSBL acoustic communications.

In one embodiment the node comprises a surface communications system enabling a node to communication when on a water surface with the or another surface vessel and/or a land-based station.

In one embodiment the node comprises a GPS receiver.

In one embodiment the node comprises a thruster arranged to automatically operate when speed of a node derived from operation of the buoyancy propulsion system is less than a threshold speed.

In a second aspect there is disclosed an autonomous seismic data acquisition node comprising the node according to the first aspect and one or more seismic sensors supported on the node for acquiring seismic data.

In one embodiment the node comprises one or more other sensors.

In a third aspect there is disclosed an autonomous ocean data acquisition node comprising the node according to the first aspect and one or more sensors capable of sensing one or more oceanographic characteristics or properties.

In a fourth aspect there is disclosed marine data acquisition system comprising a plurality of nodes according to the first aspect.

In a fifth aspect there is disclosed a marine seismic data acquisition system comprising:
  one or more surface vessels,
  a plurality of autonomous nodes capable of acquiring seismic data at one or more seabed locations, each node having a buoyancy propulsion system enabling each node to reposition between respective landed seabed locations without surfacing by variation of the node buoyancy between positive buoyancy and negative buoyancy;
  a first acoustic positioning system operable between one of the surface vessels and the nodes; and a second acoustic positioning system operable between respective submerged nodes.

In one embodiment the first acoustic positioning system is a USBL, SSBL or SBL system.

In one embodiment the second acoustic positioning system comprises a one-way travel time positioning system.

In one embodiment the one or more surface vessels comprise a node mothership having a command and control system arranged to provide centralised communication, control and monitoring of the nodes and other surface vessels.

In one embodiment the system comprises a wireless mesh communications network for enabling communication between the command and control system and the nodes via acoustic modems associated with at least the first acoustic positioning system.

In one embodiment the system comprises an acoustic doppler current profiler installed on the node mothership for providing real time water current velocity profile data to the command and control system.

In one embodiment the command control system is arranged to process and utilise the real-time current profile data to exert navigation control and scheduling of the nodes.

In one embodiment the system comprises a multibeam echo sounder installed on the node mothership and arranged acquire and provide bathymetric information in real-time to the command and control system.

In one embodiment the system comprises one or more containerised node docking systems located on a deck of node mothership wherein each containerised node docking system comprises a container having a plurality of docks, wherein each dock is arranged to house a corresponding node.

In one embodiment each containerised node docking system comprises a power distribution system arranged for electrically charging nodes when in their respective docks.

In one embodiment each containerised node docking system comprises a communications network arranged to enable communication and data transfer between a node in its dock and the command and control system.

In one embodiment each containerised node docking system comprises an automated handling system arranged to transfer a node into and out of a dock.

In one embodiment the node mothership comprises a launch and recovery system arranged to transfer a node from a first of the containerised node docking systems to a launch location on the node mothership, and transfer a node from a recovery location on the node mothership to the first or another one of the containerised node docking system.

In a sixth aspect there is disclosed a method of conducting a marine seismic survey comprising:
  transmitting seismic energy from a seismic source vessel;
  autonomously landing a plurality of nodes on a seabed at respective first locations to form an array of nodes;
  using the landed nodes to acquire seismic data at the first locations;
  varying the buoyancy of at least some of the nodes between a positive buoyancy and a negative buoyancy to facilitate transit of the nodes from their respective first locations to respective second landed seabed locations without the nodes surfacing; and
  using the landed nodes to acquire seismic data at the second locations.

In one embodiment varying the buoyancy between positive and negative buoyancy comprises controlling flow of a liquid between an inflatable bladder external of a body of the node and a reservoir internal of the body of the node.

In one embodiment the controlling flow of the liquid comprises: utilising a pressure differential to allow a liquid to bleed from the bladder to the reservoir to reduce a total displacement of the node thereby reducing the buoyancy of the node; and pumping liquid from the reservoir to the bladder to increase the total displacement of the node.

In one embodiment utilising a first acoustic positioning system operable between one or more surface vessels and the nodes to position the nodes at their respective first and second landed locations; and
  utilising a second acoustic positioning system operable between respective submerged nodes to navigate the transiting nodes from their first locations to their second locations.

In one embodiment the first acoustic positioning system comprises using USBL, SSBL, or SBL acoustic positioning.

In one embodiment the method comprises configuring respective groups of the nodes to have a same USBL, SSBL, or SBL beacon address and activating nodes in each group in a manner wherein no two nodes with the same USBL, SSBL, or SBL beacon address actively communicate via an associated USBL, SSBL, or SBL modem at the same time.

In one embodiment the method comprises utilising a second acoustic positioning system comprises using a one-way travel time acoustic positioning.

In one embodiment the method comprises operating a set of nodes at their respective first landed locations to operate as one-way travel time beacons and broadcast acoustic communication packets.

In one embodiment the method comprises enabling the transiting nodes to receive and use the broadcast an acoustic communication packets to navigate from their first landed location to a second landed location.

In a seventh aspect there is disclosed a method of conducting a marine seismic survey comprising:
  transmitting seismic energy from a seismic source vessel;
  positioning a plurality of nodes having seismic sensors to respective first landed locations on a seabed using a first acoustic positioning system;
  acquiring seismic data at the respective first landed locations using the seismic sensors of the landed nodes;
  transiting at least some of the nodes from their respective first landed locations toward respective second landed locations using a second acoustic positioning system operable between a set of the landed nodes and transiting nodes; and
  positioning the at least some of the nodes at their respective second landed position utilising the first acoustic positioning system.

In one embodiment using a first acoustic positioning system comprises using USBL, SSBL, or SBL acoustic positioning.

In one embodiment the method comprises configuring respective groups of the nodes to have a same USBL, SSBL, or SBL beacon address and activating the nodes in each group in a manner wherein no two nodes in that group with the same USBL, SSBL, or SBL beacon address actively communicate via an associated USBL, SSBL, or SBL modem at the same time.

In one embodiment utilising a second acoustic positioning system comprises using a one-way travel time acoustic positioning.

In one embodiment the method comprises activating a set of nodes at their respective first landed locations to operate as one-way travel time beacons and broadcast acoustic communication packets.

In one embodiment the method comprises enabling the transiting nodes to receive and use the broadcast an acoustic communication packets to navigate from their first landed location to a second landed location.

In one embodiment the method comprises acquiring bathymetric data during the survey in real-time and modifying an associated survey plan on the basis of the acquired bathymetric data.

In an eight aspect there is disclosed a method of remotely conducting an ocean survey comprising:

varying buoyancy of one or more ocean data acquisition submersible between a positive buoyancy and a negative buoyancy to facilitate transit of the one or more nodes from a deployment location to a first submersed survey location, wherein each node includes one or more ocean data sensors;

while transiting, enabling one or more nodes to autonomously navigate from the deployment location to the first submersed survey location; and using the one or more ocean data sensors when at the first survey location to acquire ocean data.

In one embodiment the method comprises autonomously landing the one or more nodes on a seabed at the first survey location wherein the ocean data is acquired while the one or more nodes are landed on the seabed.

In one embodiment the method comprises triggering the one or more nodes landed on the seabed to transit for reposition to a second survey location wherein the transit is performed, or assisted, by variation of the buoyancy of the node.

In one embodiment the triggering is performed on the basis of: an effluxion of time; or, in response to information collected by the one or more ocean data sensors.

In one embodiment the method comprises causing a node to surface during transit from the first survey location to the second survey location and, while surfaced, enabling the node to (a) acquire GPS data, or (b) transfer sensed ocean data to another node, or (c) wirelessly transfer sensed ocean data to a remote location, or any two or more of (a), (b) and (c).

In one embodiment the method comprises transporting the one or more nodes to the deployment location on a manned or an unmanned surface vessel.

In a ninth aspect there is disclosed a method of remotely conducting an ocean survey comprising:

transiting one or more nodes accordance with the first aspect from a deployment location to a first submersed survey location, wherein each node includes one or more ocean data sensors;

while transiting, enabling one or more nodes to autonomously navigate from the deployment location to the first submersed survey location; and using the one or more ocean data sensors when at the first survey location to acquire ocean data.

In one embodiment the first survey location is a landed location on a seabed.

In one embodiment the ocean data includes water temperature, density, chemical characteristics such as salinity, pH, oxygen content, carbon dioxide content, phosphate content; sulphur content; oceanographic conditions including ocean current velocity and hydrostatic pressure; gravitational field strength; magnetic field strength and orientation; gamma radiation; acoustic characteristics; optical characteristics; bathymetry; and aspects of the benthic zone.

BRIEF DESCRIPTION OF THE DRAWINGS

Notwithstanding any other forms which may fall within the scope of the system and method as set forth in the Summary, specific embodiments will now be described by way of example only with reference to the accompanying drawings in which:

FIG. 7b is a graphical representation of a possible operating cycle of the buoyancy system shown in FIG. 7a;

DETAILED DESCRIPTION OF CERTAIN INVENTIVE EMBODIMENTS

The following is a nonlimiting description of embodiments of an autonomous data acquisition system and method as well as an autonomous node that facilitate the system and method. The autonomous nodes carry sensors for sensing or measuring and collecting data pertaining to characteristics or physical attributes including but not limited to: seismic data; water temperature, density, chemical characteristics such as salinity, pH, oxygen content, carbon dioxide content, phosphate content; sulphur content; oceanographic conditions including ocean current velocity and hydrostatic pressure; gravitational field strength; magnetic field strength and orientation; gamma radiation; acoustic characteristics; optical characteristics; bathymetry; and aspects of the benthic zone. In this way a node can be considered to be a sensor delivery system.

First Embodiment—Seismic Survey Application

A first embodiment the disclosed node, system and method is described in relation to the data being seismic data derived from energy reflected from a surface of or otherwise propagated through a seabed. The nodes may be arranged in an array having an array footprint area. Embodiments of the disclosed system and method enable the continuous acquisition of seismic data over an area many times the array footprint area. This is possible because the nodes can autonomously reposition from respective first locations to second locations so that the array progressively traverses across the seabed. This provides the self-locating nature of the nodes. Thus, the nodes can form a rolling array that can progressively and continuously roll or traverse across or over the survey area, which may be many times larger than the array footprint area.

General System and Method Characteristics

The method 10 and system 100 are very well suited to marine seismic surveying. Embodiments for marine surveying allow a survey vessel to operate continuously even in deep water (e.g. exceeding 1000 m depth) without the need to wait for repositioning or moving of seismic detecting nodes because the nodes reposition by themselves. In such embodiments the method and system also include use of a seismic source. A subset of the nodes which are outside of the shot offset area reposition themselves to their second location on the seabed. The subsets of nodes may be triggered to reposition upon (a) passage of time (i.e. a timer); or (b) receipt of a remotely transmitted signal; or both (a) and (b). Other nodes in the array remain in their first locations actively acquiring seismic data until they are triggered to reposition to their second locations.

Initial modelling has indicated that embodiments of the disclosed method, system and nodes when applied to the marine survey environment, can provide substantial time saving that may provide a cost saving in the order of 70% for a deep water seismic survey.

Figure 1A:
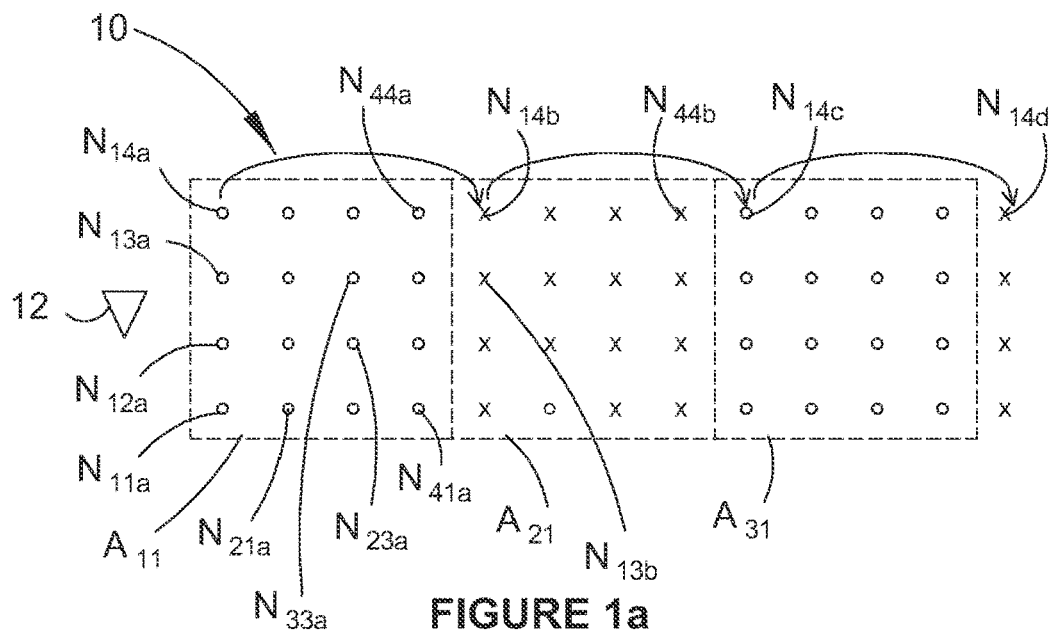
FIG. 1a is a schematic representation in plan view of a first embodiment of the disclosed system and method for acquiring data.
Figure 1B:
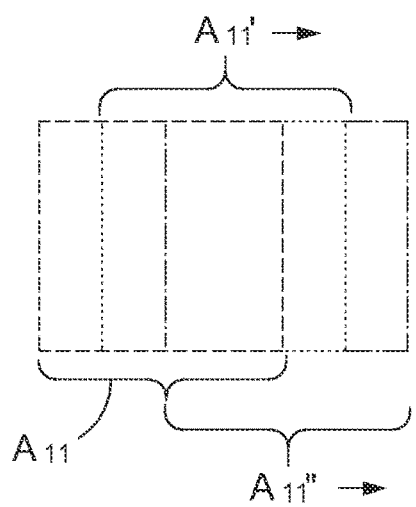
FIG. 1b is a schematic representation of a rolling nature of the system and method of acquiring seismic data of the first embodiment.
Figure 2:
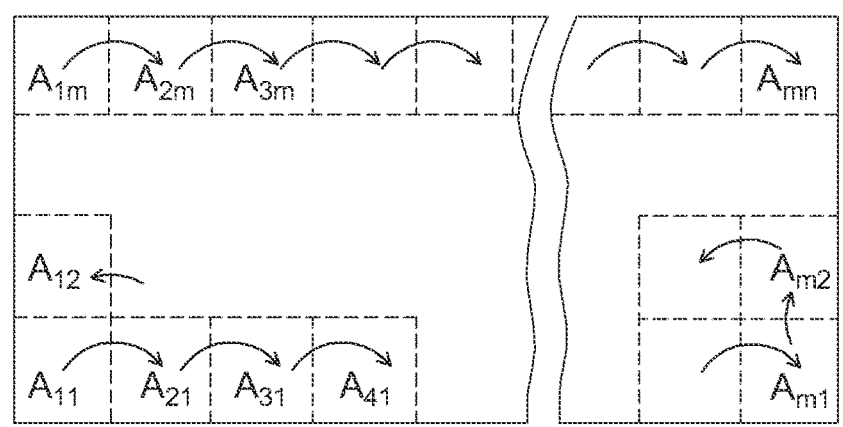
FIG. 2 illustrates how the first embodiment of the disclosed system and method enable the acquisition of data over an area greater than that covered by a plurality of autonomous data acquisition nodes which may be incorporated in the disclosed method and system for acquiring data.
Figure 3:
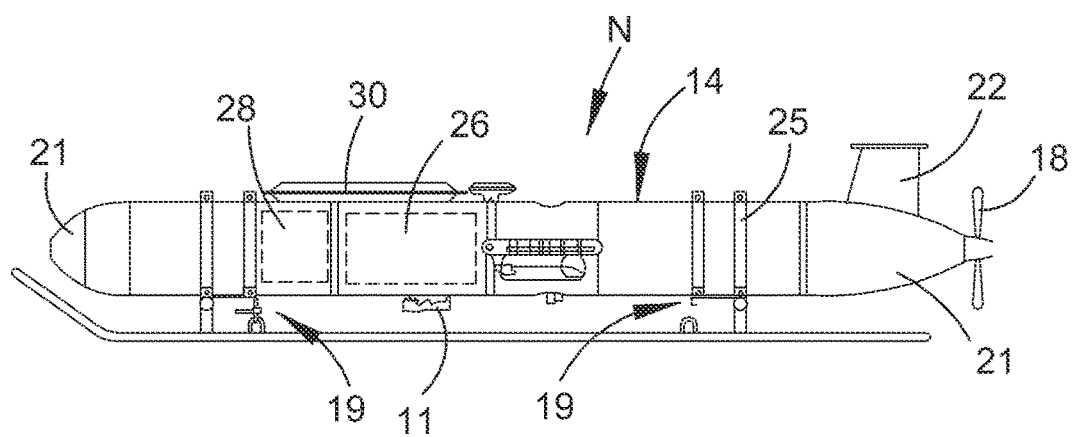
FIG. 3 is a side view of one embodiment of a node that may be incorporated in various embodiments of the disclosed method and system for acquiring data.
Figure 4:
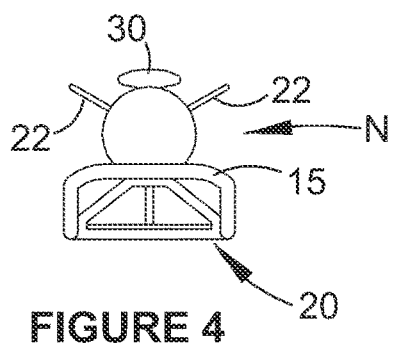
FIG. 4 is front view of the node shown in FIG. 3.
Figure 5:
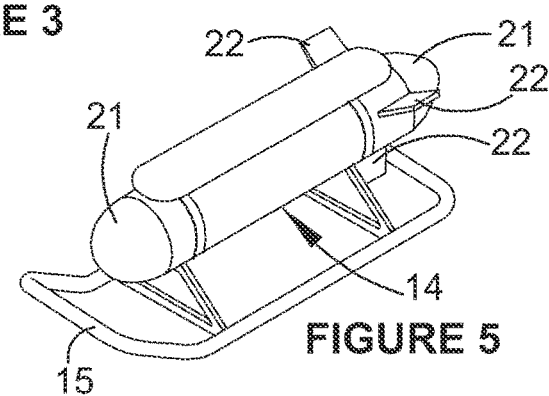
FIG. 5 is an isometric view from one side of the node shown in FIG. 3.
Figure 6A:
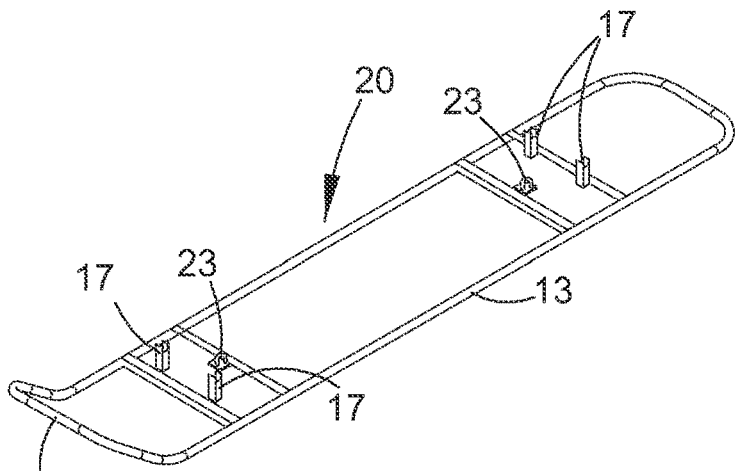
FIG. 6a is an isometric view of a skid incorporated in the node shown in FIGS. 3 and 4.
Figure 6B:
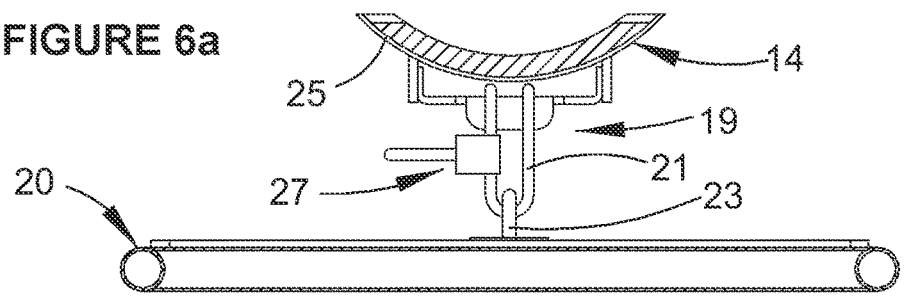
FIG. 6b is a representation of a releasable coupling system that may be used to releasably couple a body of the node to the skid.

FIGS. 1a, 1b and 2 depict in a general sense how nodes N in an embodiment of the disclosed data acquisition system 10 move/reposition to successive seabed locations to conduct a marine seismic survey over a wide area. The system 10 comprises a plurality of autonomous self-locating nodes $N_{xy}$ (hereinafter referred to in general as "nodes N"). Each node N is provided with sensors for sensing physical events or characteristics such as seismic energy which is reflected by or otherwise propagated through a seabed. The seismic energy may be initially transmitted via a seismic source 12. As is understood in the art the seismic energy is reflected from a surface or at a boundary between materials of different refractive index in the seabed. Each of the nodes receives seismic energy in a specific location on the seabed. This may be by way of the equipping the nodes N with geophones, hydrophones, accelerometers or other seismic sensors.

In the embodiment shown in FIG. 1a the nodes N are arranged in a 4×4 array on the seabed. A 4×4 array is used for illustrative purposes only. In practise embodiments of the system 10 and method may use several hundred or thousand for example, but not limited to between 500-10,000 autonomous nodes N. This number of nodes may provide an array area of between 20 $Km^2$–400 $Km^2$.

The nodes in the array may be designated as $N_{xy}a$ where x and y denote X and Y location coordinates respectively for a node N with reference to a Cartesian coordinate system projected onto an array at seabed location "a". For example, the node $N_{11a}$ is the node at x,y location 1,1 in an array at location "a": node $N_{23a}$ is the node at x,y location 2,3 in the array location "a".

In the system 10 each of the nodes N is arranged to autonomously move to a second respective seabed location "b". At their location "b" the nodes N are also able to receive seismic energy reflected or otherwise propagated through the seabed S.

In a marine seismic embodiment or application of the system 10 applied to the marine environment the seismic moving seismic source 12 may be on or towed by marine vessel.

Looking again at the embodiment of system 10 shown in FIG. 1a in this example the 4×4 array of nodes N can acquire seismic data for a survey area A11. As a seismic survey is being conducted using the system 10 and corresponding method, the nodes N progressively move from their first location "a" to their second location "b". The autonomous movement of the nodes N from their first location "a" to their second location 'b" is in response to a trigger signal. The trigger signal can be based on the passage of time and thus be generated by a local or remote timer. In another embodiment the trigger signal may be a non-temporal signal transmitted from a remote location, for example form an unmanned surface vehicle. The remote location may be the same location as the source 12.

While some of the nodes N are in transit moving from their location "a" to "b" other nodes N are landed on the seabed and receiving or otherwise acquiring seismic data. Eventually however all the nodes N will autonomously move/reposition from their first location "a" to their second location "b". In one example, if the source 12 is traversing back and forth in a direction parallel to say the Y axis of the arrays, then the nodes N progressively move in a sequence of X row 1, then row 2, row 3 and row 4.

In more detail the node $N_{11a}$ may reposition to location "b" and thus become designated as node $N_{11b}$. Thereafter the nodes $N_{xya}$ reposition in the following sequence to their respective location "b" and thereafter are designated as nodes $N_{xyb}$.

$N_{12a} \rightarrow N_{12b}$
$N_{13a} \rightarrow N_{13b}$
$N_{14a} \rightarrow N_{14b}$
$N_{24a} \rightarrow N_{24b}$
$N_{23a} \rightarrow N_{23b}$
$N_{43a} \rightarrow N_{43b}$
$N_{44a} \rightarrow N_{44b}$ The nodes $N_{11a}$, $N_{12a}$, $N_{13a}$, $N_{14a}$ in the first x-axis row in the area A11 which have moved/repositioned to their second row at location "b" now become nodes $N_{11b}$, $N_{12b}$, $N_{13b}$, $N_{14b}$. The first x-axis row of the 4×4 array has moved four rows to the right, over the remaining nodes in area A11. This is illustrated in FIG. 1b which effectively shows the 4×4 array translated "one row" to right and into area A11'. In this example the footprint area of the array of nodes N has not changed but it's location has translated to the right. In this way the array of nodes can traverse an area many times that of its footprint area. When the second x-axis row of nodes at location "a" have repositioned to their locations "b", they have moved four rows to the right to area A11" and so on. As this continues for all the nodes, the array of nodes N effectively rolls along the seabed enabling the acquisition of seismic data for an area of seabed many times that of the array measurement area.

When all the nodes in the array at location "a" have repositioned to their respective location "b" then the node's footprint area is that designated as A21 in FIG. 1a. This is the same as area A11, but translated by a length equal to the transverse length of the area A11. Therefore, the same array of nodes N can now provide seismic survey data for the area A21.

The operation and motion of the nodes at location "b" continues in the same way as described above, with the nodes $N_{xyb}$ acquiring seismic data pertaining to the seabed S for the measurement area A12. The nodes $N_{xyb}$ will progressively reposition to location "c". (The locations "b" and "c" can be considered as new first and second locations respectively).

In some embodiments the effective measurement array of nodes N, that is the nodes which are active at any one time acquiring seismic data will include a combination of nodes at locations "a" and "b". For example, with reference to FIG. 1a after the nodes in the first x-axis row in the array area A11 have moved to their location "b" on the seabed, they may be activated to acquire seismic data together with say the nodes in the third and fourth x-axis row of the of the array at location "a". In other words, the system and method may enable acquisition of seismic data from a substantially constant number of nodes N covering a substantially constant (though moving) area.

The above process continues until the entire survey area is surveyed. The nodes, and therefore the measurement area A, can be steered in any desired manner to progressively cover the survey area. This is exemplified in FIG. 2 which shows the measurement area A first traversing to the right from A11 to Am1, then north or up to area Am2, progressively to the left to area A12 and so on until the last measurement area Amn is surveyed. This can be performed continuously as the source 12 traverses across the seabed survey area.

Nodes

FIGS. 3-8 depict an embodiment of the node N when the system 10 and associated method is used for marine seismic surveying. In this embodiment the node N is a submersible node having a body 14 with a generally hydrodynamic shape. The body 14 includes a high-pressure hull, which may be made from aluminium with machined aluminium end caps.

Major external, or at least partially external aspects of each node N, include a buoyancy system 16, a thruster 18, a skid 20 and control surfaces/fins 22.

The body 14 in this embodiment is releasably coupled to the skid 20 which supports the body 14 when landed on the seabed. The skid 20 provides a stable base which engages with the seabed. The body 14 remains in a fixed relative disposition to the skid 20. In this way the orientation of the body 14 on the seabed is relatively predictable.

In this embodiment the skid 20 is formed with a generally rectangular base frame 13 with an upwardly kicked front-end 15. Posts 17 are affixed to the base frame 13 and space the body 14 from the skid 20. A releasable coupling system 19 releasably couples the body 14 to the skid 20. The releasable coupling system 19 may be achieved by many different mechanisms including but not limited to a burn wire, a screw thread coupling, or a bayonet connection. In this illustrated embodiment the releasable coupling system 19 is a burn wire system which includes a sacrificial rope 21 that ties a lug 23 fixed to the skid 20 to a hull clamp 25 fixed to the body 14. The releasable coupling system 19 has a burn wire assembly 27 connected to opposite ends of the sacrificial rope 21. Activation of the releasable coupling system 19 enables the body 14 of the node N to be retrieved in the event of the skid 20 is detected as being caught on a seabed structure; or otherwise stuck on the seabed following being commanded to take-off.

In an alternate embodiment the skid 20 which orientates the body 14 on, and provides mechanical coupling with, the seabed, can be replaced with other structures that perform the same functionality. One example of this is a fairing 20' which may be provided with three or more contact points or regions that orientate the node N on the seabed and provide mechanical coupling. It will be understood that the provision of for example three contact points will orientate the body 14 in a plain where a central longitudinal axis of the body 14 is a known orientation relative to that plain.

Irrespective of the nature and configuration of the skid, fairing or indeed the body 14 itself, the node is configured in manner so that when landed on the seabed, the negative buoyancy of the node is substantially evenly distributed over contact locations between the node and the seabed. For example, when the node N is provided with the skid 20 the contact locations would ordinarily be along the base frame 13. However, if a fairing 20' is used instead of the skid the contact locations would be the contact points or regions of the fairing that are designed to contact the seabed and correctly orientate the node N/body 14. In yet a further variation a node may include both a skid 20 and a fairing 20'.

In this alternate arrangement the option of automatically releasing from the skid 20 is not available. However, recovery assistance can be realised by jettisoning the ballast/weight 82 (shown in FIG. 8 and described later) to provide additional buoyancy to allow the node to surface, even in the case of buoyancy system failure.

The weight of the skid 20 can be matched to the available buoyancy range of the node so that dropping the skid will result in the node having a positive buoyancy but where the buoyancy can still be modulated between positive and negative buoyancy to maintain the functionality of the buoyancy propulsion system (discussed further below). In this way the node is still able to move to a recovery location, propelled at least in part by modulation of buoyancy.

The node N may also be provided with a downward facing acoustic receiver 11 for receiving acoustic communication packets from other nodes which are operated or otherwise activated to act as position reference beacons. The nodes which are capable of operating as beacons may be provided with a top mounted transducer for broadcasting the acoustic communications packets. This aspect is described later in the specification.

The buoyancy system 16 provides buoyancy for the purposes of (a) transiting (i.e. propulsion) of the node through the water (b) landing and recovery of the node, and (c) control seabed coupling. The buoyancy system 16 operates to vary the displacement of the node by varying the overall volume of water displaced by the node, i.e. the total displacement of the node. This is to be contrast with buoyancy systems that operate by moving a liquid and gas into or out of fixed volume chambers.

The buoyancy system 16 has at least one internal fluid reservoir 26 (which may be of fixed or variable or flexible volume), a pump system 28, and at least one (two shown in FIG. 8) external inflatable (i.e. variable volume) bladder 30. In this context the term "external" means that the inflatable bladders 30 are in fluid communication with ambient hydrostatic pressure; and their variation in volume results in an overall variation of the volume (i.e. displacement) of the node. For example, this would exclude an inflatable bladder located within body 14, that is in fluid communication with ambient hydrostatic pressure (for example via a hole in the body 14) but where a change in volume of the inflatable bladder does not change the overall volume of the node.

The location of reservoir 26 and the bladder 30 may be arranged in a way so that when a node is landed on the seabed, its landed negative buoyancy is distributed evenly over the skid 20 or seabed contact points of the node to assist in providing stable coupling with the seabed. In embodiments where a node has more than one internal reservoir 26 the internal reservoirs may be in fluid communication with each other. This then allows control of the liquid distribution within the multiple internal reservoirs. In turn this provides control of the mass distribution of the node.

In one example this may be arranged by attaching the bladder(s) 30 and outside of the body 14. A fairing (shown in phantom as item 20' in FIG. 8) may also be coupled to the body 14 (in addition, or as an alternative, to the skid 20) about the bladder(s) 30 to provide protection from damage and improved hydrodynamic profile. For ease of description the embodiment will be described hereinafter as having one bladder 30 external of the body 14. By operation of the pump system 28 an incompressible fluid, i.e. a liquid such as an oil, can be moved between the reservoir 26 within the body 14 and the bladder 30 external to the body 14. The bladder 30 is inflated by the fluid causing an increase in the displacement (i.e. volume) of the bladder 30 and thus an increase in the buoyancy of the node N.

The bladder 30 can be inflated with the fluid to provide a positive buoyancy for the node N during flight of the node N, i.e. as it lifts from the seabed and rises to its transit depth. To cause the node N to dive the fluid is bled from the bladder 30 back to the internal reservoir 26 thereby reducing the displaced volume of the node N to provide a negative buoyancy. As explained in greater detail below the bleeding of the fluid back to the internal reservoir 26 is by way of pressure differential between the reservoir 26 and the bladder 30.

Once the node N has landed on the seabed the buoyancy system may be operated to control seabed coupling, i.e. the contact pressure between the node N and the seabed. This enables control of the degree of sinking of the node N into the seabed and the degree of coupling between the seabed and the node N. The negative buoyancy can additionally or alternately be increased or otherwise controlled for the purpose of holding the node N stationary at its landed location. For example, the negative buoyancy can be arranged to be sufficient to hold the node N stationary on the seabed in currents of a predetermined velocity. Maintaining the node N stationary while actively acquiring seismic data assists in terms of data quality.

Figure 7A:
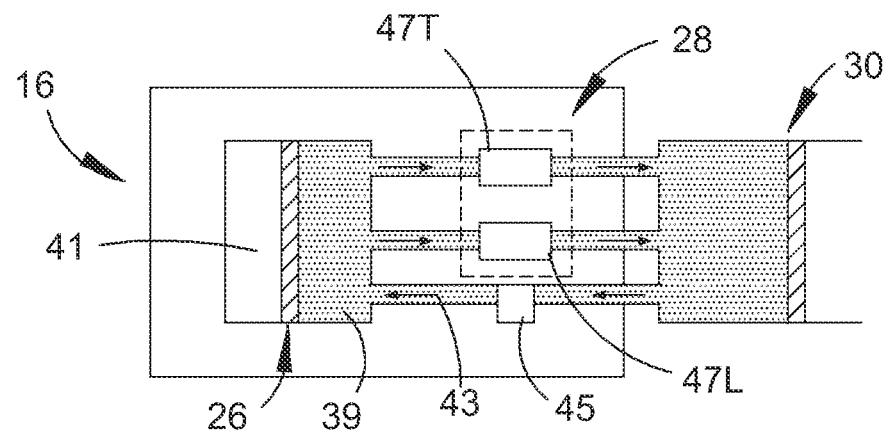
FIG. 7a is a schematic representation a buoyancy system incorporated in one embodiment of the disclosed node.

FIG. 7a is a schematic representation of the buoyancy system 16 showing the internal reservoir 26, the pump system 28, and the bladder 30. The reservoir 26 has a cylinder 35, and an internal sliding piston 37. The piston 37 divides the cylinder into a hydraulic region 39 containing oil and a pneumatic region 41 which may be evacuated or at a negative pressure relative to at least ambient pressure. The regions 39 and 41 are of variable volume and separate from each other by the piston 37. A bleed path 43 enables fluid communication between the bladder 30 to flow back to the reservoir 26. The fluid communication is controlled by a one-way valve 45 in the bleed path 43. When the valve 45 is open liquid is able to flow in the direction from the bladder 30 to the reservoir 26. When the valve 45 is closed no liquid flow is possible through the bleed path 43.

When the valve 45 is open the liquid flow is by virtue of pressure differential between the reservoir 26 and the bladder 30. The pressure differential is the differential between hydrostatic pressure operating on the bladder 30 and the vacuum or release relative vacuum in the region 41 of the reservoir 26. In this way the bleed of liquid occurs without the need to activate any pumping mechanism so that the only power required is to open the valve 45. This assists in reducing power consumption and extending the endurance of the node.

The pump system 28 may be in the form of a single pump, or as illustrated in the present embodiment two separate pumps, namely a transit pump 47T and a lift-off pump 47L.

Irrespective of the number of pumps included in the pump system 28, the pump system operates to transfer fluid (i.e. liquid) from the reservoir 26 to the bladder 30 and thereby increase buoyancy. The bleed path 43 when opened returns liquid from the bladder 30 to the reservoir 26 to thereby decrease buoyancy. When a node has landed on the seabed, by allowing this flow through the bleed path 43 to continue, the resulting additional negative buoyancy increases the coupling force between the node and the seabed.

In the current illustrated embodiment where the pumping system 28 includes a separate transit pump 47T and lift-off pump 47L, the pump 47T may be in the form of a relatively high flow rate low pressure pump while the lift-off pump 47L may be in the form of a relatively low flow rate higher pressure. In the alternate embodiment a single pump can be operated to provide the same effect as the two separate pumps. However, in the dual pump embodiment using transit pump 47T during transit phases may provide increased node endurance and improve buoyancy propulsion effectiveness due to faster, more efficient pumping during inflections.

Figure 7B:
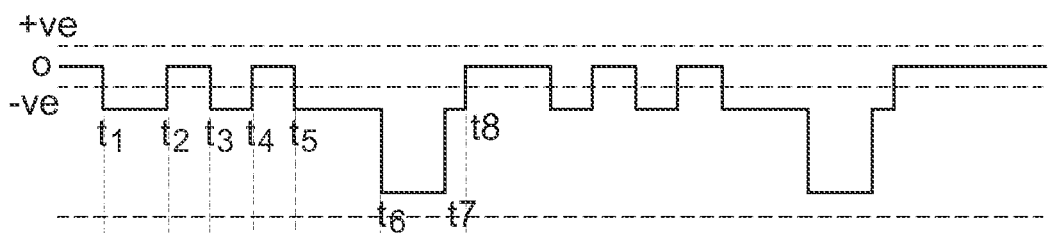
Figure 7C:
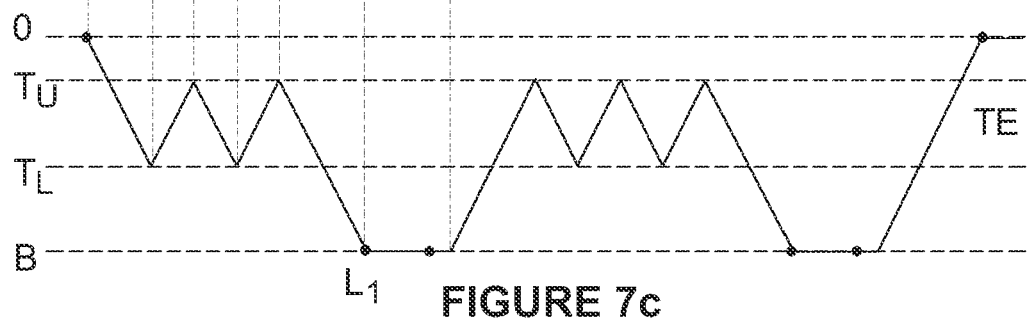
FIG. 7c is a schematic representation of a flight path of a node transiting from a water surface to a landed location in accordance with an embodiment of the disclosed method.
Figure 7D:
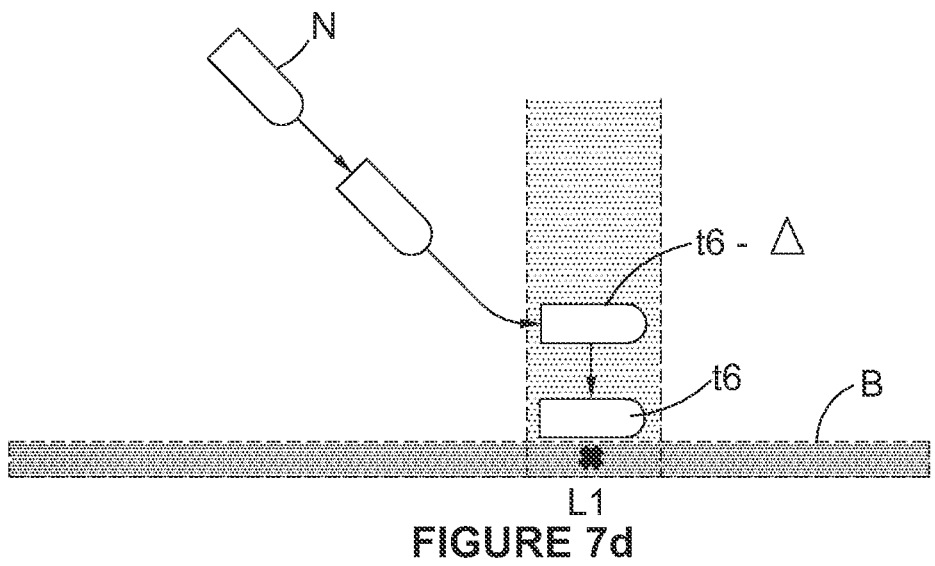
FIG. 7d is a schematic representation of a final approach of a node when landing at a seabed location.

The operation of the buoyancy system 16 for the purposes of transiting a node through the water, facilitating the landing and recovery of a node, and controlling seabed coupling is described in relation to FIGS. 7b, 7c and 7d. FIG. 7b illustrates the operation of the pump system 28. FIG. 7c shows the corresponding effects on the node behaviour in the water. FIG. 7d shows a possible node touch down flight path.

In FIG. 7b a neutral buoyancy level is designated by the number "0" on the vertical buoyancy axis. The neutral buoyancy is the buoyancy or displacement of the node required for no vertical movement, i.e. when the density of the node matches the density of the water.

In FIG. 7c the vertical depth axis shows a level 0 being at the water surface, and a depth B representing the depth of the seabed from the water surface. A transit envelope TE is represented on FIG. 7c as being between an upper transit depth TU, which is below the water surface, and a lower transit depth TL which is below the upper transit depth TE but above the depth B of the seabed.

When a node is initially launched it may be configured to have a positive buoyancy to float on water surface at the depth of zero. In this configuration the bladder 30 is at least partially but more likely fully inflated with liquid thereby expanding its volume to provide the buoyancy required for the node to float. In order for the node to reach a first target landed location L1 (FIG. 7c) the buoyancy system 16 is operated to decrease the displacement of the node by opening the valve 45 to allow liquid to flow from the bladder 30 to the reservoir 26 through the bleed path 43 by way of pressure differential. This occurs at time t1 shown on FIG. 7b.

As a result of this as shown in FIG. 7c the node sinks or dives. The fluid transfer is controlled so that the node sinks to the lower level TL of the transit envelope TE at a specified vertical velocity. The vertical velocity (i.e. for diving or rising) can be derived from the rate of change of pressure. This is measured by an onboard pressure sensor 70 (shown in FIG. 8). If the node is diving too quickly the pump system 28 is operated to increase buoyancy, if the node is diving too slowly the bleed path 43 is opened to reduce buoyancy. (The converse applies when the node is rising, i.e. rising too quickly the bleed path 43 is opened, rising too slowly the pump system 28 is operated.) When the vertical velocity is within a required or desired band, then the node buoyancy is adequate for the corresponding transit phase and the buoyancy system 16 ceases to transfer liquid between the bladder 30 and the reservoir 26. Thus, power is only consumed by the buoyancy system 16 for the node propulsion to when it is required to change node velocity (i.e. node vertical speed or vertical direction). In FIG. 7c it is assumed that the start position of the node on the water surface is such that it is not possible to reach the target landing location L1 having regard to the rate and pitch of descent in a single continuous dive path within a reasonable time period.

Notwithstanding that the node N is provided with the thruster 18 the general idea in the method of operation is to utilise the buoyancy system for propulsion to provide increased efficiency, low power consumption and long duration. As a consequence, it is possible that nodes can continue to operate autonomously and reposition between multiple locations over a period of the many months (for example up to 3 months or more) required to complete a seismic survey. Consequently, the requirement for recovery and recharge mid-survey can be eliminated or at least minimised to reduce operations complexity.

When the node reaches the lower level TL of the transit envelope TE at the time t2 the buoyancy system 16 is operated to now increase the buoyancy of the node. This is achieved by closing the valve 45 and operating the pump system 28 (in this case the transit pump 47T) to transfer fluid from the reservoir 26 to the bladder 30 inflating the bladder 30 thereby increasing its volume and thus the displacement of the node. Consequently, the node commences to rise at a trajectory controlled by the control surfaces 22 and a pitch controller (described later). During this rise the node N traverses over the seabed reducing the lateral distance to the target landing location L1. At the time t3 when the node N reaches the upper level TU the buoyancy system 16, operates to reduce the buoyancy to cause the node N to dive toward the seabed. This is achieved by stopping the operation of the pumping system 28 (in this embodiment the pump 47T) and opening the valve 45 allowing oil to flow through the bleed path 43 from the bladder 30 to the reservoir 26.

The node continues to travel through the transit envelope TE oscillating between the levels TU and TL in the manner described above until it is within reach of the landed location L1 in a single dive. In FIGS. 7b and 7c, this occurs at the time t5 when the buoyancy system 16 operates to stop the pumping system 28 and open the valve 45 to provide a negative buoyancy. This causes the node to dive below the lower level TL toward the target landed seabed location L1. The pitch angle of the node during this dive is negative with respect to the horizontal.

As shown in FIG. 7d the buoyancy and pitch is controlled so that at a time t6-Δ, the node has levelled off (i.e. the longitudinal axis of the body 14 being substantially parallel with the seabed B) and substantially stationary a short distance (for example up to 2 m) above the bottom of the seabed B where after the negative buoyancy eventually sinks the node onto the seabed at the target landing location L1.

The negative buoyancy to affect the dive of the node to land on the seabed will provide a degree of coupling (i.e. contact force) with the seabed. However, the degree of coupling can be increased by operating the buoyancy system 16 to again open the valve 45 to increase the negative buoyancy beyond that required to dive during the landing phase. The effect of this is to continue reducing the volume of the bladder 30, therefore reducing the buoyancy of the node and increasing the degree of coupling with the seabed and hence keeping the node stationary.

When it is required to recover or reposition a node from the seabed the buoyancy system operates the pump system 28 to pump fluid (liquid) from the reservoir 26 to the bladder 30, to increase the overall displacement of the node N and thus its buoyancy.

In the present embodiment where the pumping system 28 has separate transit and lift-off pumps, the lift-off pump 47L is initially operated (at time t7 on FIG. 7b) to return liquid to the bladder 30 to reduce the seabed coupling and restore the buoyancy the negative buoyancy level required to initially required to land on the seabed and thereby assist in the lift off of the node. Thereafter at t8 the transit pump 47T is operated to transfer liquid to the bladder 30 to achieve a positive buoyancy for the node to commence to reposition itself to its next target landing location.

In an alternate embodiment where the pumping system 28 comprises a single pump only then all of the above described actions of the transit pump 47T and lift-off pump 47L are performed by one and the same pump. In either case (i.e. the pump system having a single pump or dual pumps) the fluid transfer between the reservoir 26 and the bladder 30 is monitored and the buoyancy state is set by software (in the main controller described later) that controls pump system 28 and bleed valve 45 so that the node achieves the desired/commanded buoyancy.

When a node is traversing between successive landed/target locations the buoyancy system 16 operates to lift the node from the seabed to the transit envelope, and subsequently causes the node to traverse across the seabed by one or more cycles of rising and diving within the transit envelope TE until it is at a position where it can land at the next target landing location in the manner described above in relation to the location L1.

As would be appreciated the node has now repositioned itself between successive locations along the seabed by action of the buoyancy system alone. The thruster 18 may be operated:
- during the final stages of landing if necessary in order to achieve a particular orientation of the node on the seabed; or
- if buoyancy propulsion speed is inadequate for system operations—i.e. activated if the estimated node transit velocity is below a defined threshold velocity required to reach a desired position within a designated time period. One example of this is may be in response to high currents which may exceed buoyancy transit velocity.

As indicated above this provides the node N with the ability to traverse between multiple landed locations over an extended period of time (e.g. several months) without the need to surface for mid—survey recovery and battery recharging.

From the above description it will be apparent that the buoyancy system 16 acts as and can be considered to be a buoyancy propulsion system which enables or facilitates propulsion of a node between respective seabed locations by dynamic variation of the node buoyancy between positive buoyancy and negative buoyancy.

The control surfaces/fins 22 can be autonomously (or remotely) operated to provide control over the transit path of a node N including its landing flight path orientation when moving to its second location "b".

The node has a controller 32 that provides low level control of the node. The controller 32 is operatively associated with the buoyancy system 16, the control surfaces 22, the thruster 18 a pitch control system 38. The pitch control system 38 can be operated by the controller 32 to change the mass distribution in the node N. In one example this can be achieved for example by providing the node with a mass on a threaded shaft that extends parallel to a longitudinal axis of the body 14 and then operating the shaft to move the mass fore or aft. In an alternate example one or both reservoirs 26, 30 can comprise multiple fluidly connected receptacles distributed along the length of the body 14 in which fluid can be selectively pumped to cause a change in buoyancy distribution and thereby control the pitch of the node.

Power for the controller 32, and indeed all the powered systems and devices of the node N, is provided by an on-board rechargeable battery pack 34. The battery pack 34 is coupled to a battery management system 36, a power management system 39, and a battery charging connector 40 accessible from the outside of the body 14. The power management system 39 may include a regulator for charging the battery pack 34 and providing regulated current and/or voltage to the node on board systems and devices. The battery management system 36 monitors the charge of the battery pack 34 and provides battery charge information and status to the controller 32. The controller 32 may use this information to facilitate an off cycle recovery of the node for the purpose of recharging the battery pack 34.

A main control unit 40 provides high level control and system integration for the node including its swarm and system behaviour. In one example the unit 40 incorporates Mission Oriented Operating Suite (MOOS) and MOOS-IvP (Interval Programming). MOOS is an open source publish-and-subscribe middleware software system for robotic platforms, and MOOS IvP is an extension to MOOS that adds a higher level of autonomy and behaviour fusion for a robotic system.

The main control unit 40 is operatively associated with the node navigation and communications systems and devices. The main control unit 40 is able to process inputs from the navigation system and control the operation of the node N. The navigation system comprises a number of different systems including a GPS 50 that may optionally be augmented with an Iridium™ satellite communications modem 52. External antenna GPS and Iridium antennas 54 and 56 are mounted on the body 14 and connected to the GPS 50 and the Iridium modem 52 respectively. A stable, low-drift system clock 58 which is coupled to the controller 32 may synchronised via the GPS 50 or by the CCS 98 whilst located within the CNDS 96.

To facilitate acoustic communications and navigation the node is provided with an integrated USBL/SSBL/SBL transducer and USBL/SSBL/SBL acoustic modem 60. (Throughout this specification, except where the context requires otherwise due to express language or necessary implication, the acronym "USBL" is intended to be a reference to "USBL", "SSBL" or "SBL".) The USBL transducer and modem 60 facilitates: USBL acoustic communications with a surface vessel, or indeed with other underwater vessels including other nodes; and USBL positioning. The USBL transducer and modem 60 may also be arranged to transmit acoustic communications packets/beacon pings that can be used for one-way transit time (OWTT) positioning. OWTT acoustic transducers 62T and 62B are mounted on the top and bottom respectively of the node. The transducer 62T is operated to broadcast acoustic communications packets, if and when the node is operated as an OWTT beacon. The transducer 62L is used to receive the acoustic communications packets from the nodes acting as OWTT beacons. As described later the acoustic communications packets are used by the nodes for navigation when repositioning between successive landed locations.

A RF modem 64 is housed within the body 14 to enable Wi-Fi or other wireless communications. A RF antenna 66 is mounted on an outside of the body 14 and connected to the RF modem 64 The RF modem 64 enables a node on the water surface to communicate with surface vessels of the system such as a USV 88 or mothership 90.

Other systems and devices on the node include an inertial measurement unit (IMU) 68, pressure sensor 70 and an altimeter 72. The altimeter 72 includes a transceiver 74 mounted on an exterior of the body 14. Signals from the IMU 68, pressure sensor and altimeter 72 are delivered to the controller 32 and/or the control unit 40.

One or more sensors 76a, 76b (hereinafter referred to in general as sensors 76) are supported by the body 14 and/or housed within the body 14 for sensing various environmental conditions or events. When the node N is used for seismic surveying the sensors 76a comprise seismic sensors. The seismic sensors may include geophones, hydrophones and/or accelerometers supported by the body 14 or the skid 20. The sensors 76a received seismic energy either directly from the source 12, via reflection from the seabed, or after reflection/refraction of seismic energy at boundaries within the seabed. Examples of the sensors 76b include those for measuring but are not limited to water temperature, density, chemical characteristics such as salinity, pH, oxygen content, carbon dioxide content, phosphate content; sulphur content; oceanographic conditions including ocean current velocity and hydrostatic pressure; gravitational field strength; magnetic field strength and orientation; gamma radiation; acoustic characteristics; optical characteristics; bathymetry; and aspects of the benthic zone. The node may also be provided with still and/or video cameras.

Measurement or data from the sensors 76 is stored in an onboard data storage 78. A data and communications connector 80 is supported on, and accessible from the outside of, the body 14. The connector 80 allows the upload of configuration and other data and control algorithms and programs to the node as well as the off load of sensor data stored in the data storage 78. Additionally, data may be transmitted wirelessly via RF/Wi-fi or Iridium communication.

Figure 8:
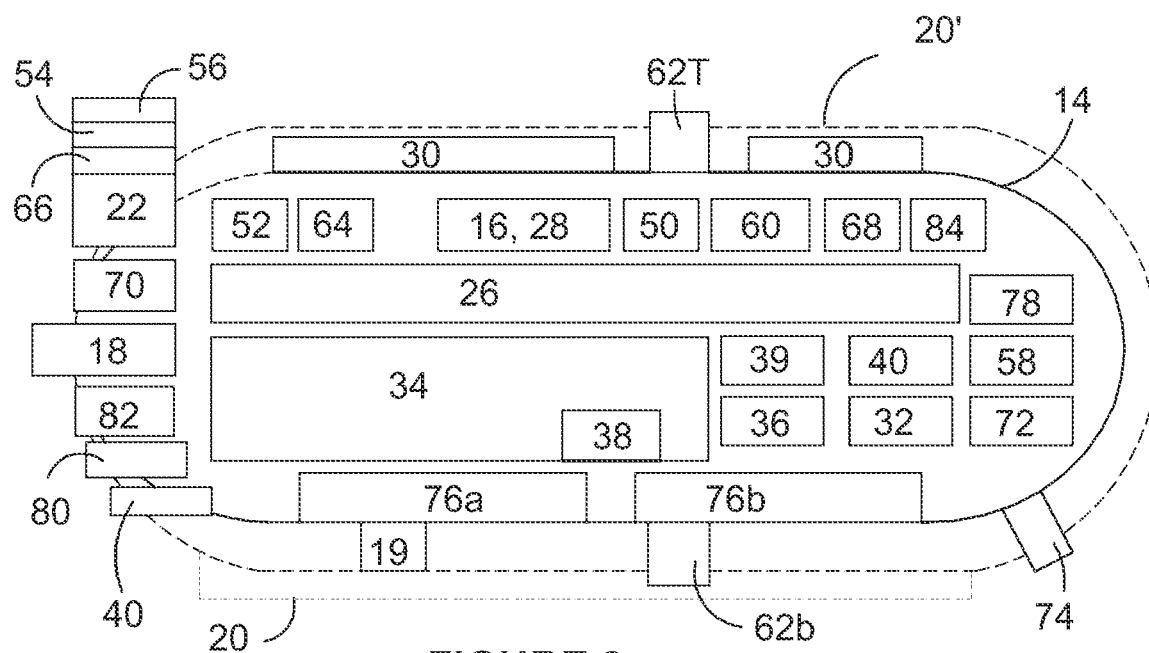
FIG. 8 is block diagram of the node.

As shown in FIG. 8 of the node N may also be provided with an emergency recovery system 82. The emergency recovery system 82 may include a weight that can be jettisoned in an emergency situation to provide the node with positive buoyancy to bring the node N to the water surface. A backup locator beacon 84 that emits a signal to facilitate location of the node N in the case of primary system failure.

Figure 9:
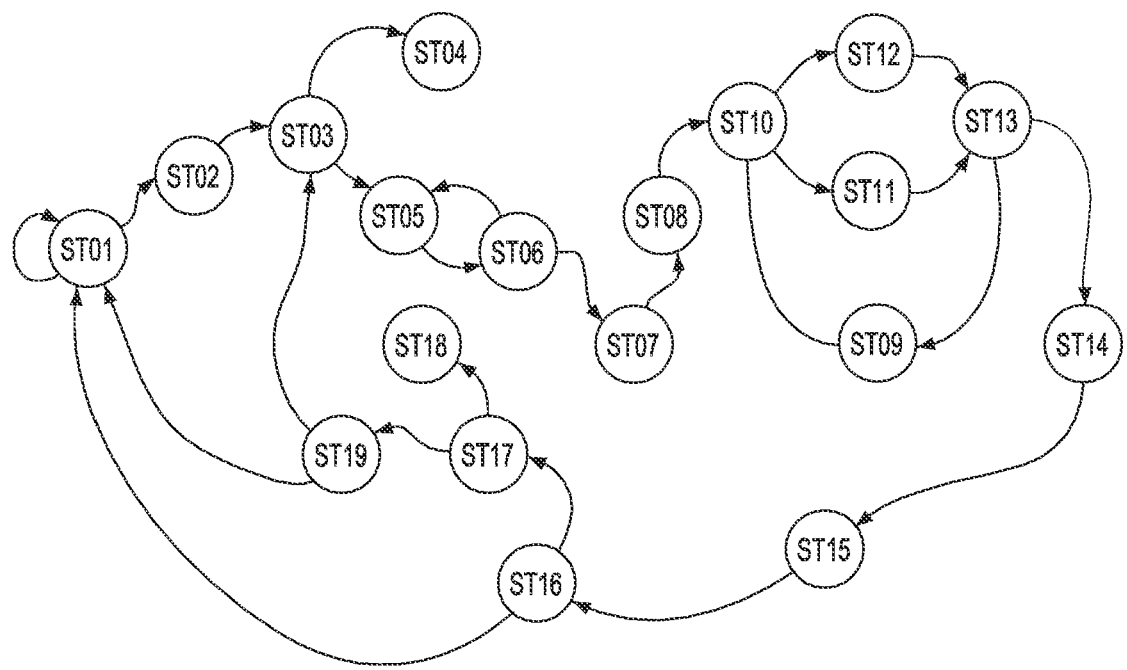
FIG. 9 is a State Diagram of a node.

The nodes have a series of states and transitions which control their behaviour throughout all aspects their operation. FIG. 9 is a node state diagram and the table below briefly describes the nature of each node state.

On each state transition the new state of the node is logged, with timestamp, onboard and written to a control and command system data base (CCS DB) on a node mothership (NMS) 90 (both described later with reference to FIGS. 10-18b). Some states may immediately transition to next state.

The node states are referred to later in the specification particularly in relation to the description of the method 100 of acquiring data which is described with reference to FIGS. 9-16.

TABLE 1

Node States

| State ID | State | Summary |
| --- | --- | --- |
| ST01 | OFF | Node Powered OFF |
| ST02 | INITAL | Node Powered ON and in initial startup state Clock 58 syncronisation occurs |
| ST03 | PRE_CHECK | Node Running automated system functional pre-checks Results written to the command and control system database (CC DB) which is remote form the node, for example on a mothership 90 |
| ST04 | PRE_CHECK_FAILED | Pre-check failed - Node requires manual operator intervention Alert issued |
| ST05 | CONFIG | Configuration & survey plan data parsed to node |
| ST06 | READY_TO_DEPLOY | Node ready to deploy |
| ST07 | DEPLOYED | Node in-water, on surface and positively buoyant |
| ST08 | INITIAL_TRANIST | Node transiting to initial commanded receiver location USBL_MODE set to ACTIVE (i.e. ultrashort baseline (USBL) communications and navigation/positioning equipment on the node is active, enabling the node to receive navigation data from external sources (such as an unmanned surface vehicle (USV) or mothership |
| ST09 | TRANIST | Node transiting to commanded receiver location, within commanded depth band, using received acoustic communications packets from beacon broadcast (for example by way of synchronous clock one-way travel time (OWTT) processing) to update dead reckoned position estimate for navigation USBL_MODE set to SLEEP - listening on configured USBL beacon address (BA) but not responding or acting until received WAKEUP command |
| ST10 | LANDING | Active two-way USBL comms and positioning to landing location & activation of landing mode |
| ST11 | LANDED | Node landed and recording data USBL_MODE set to SLEEP - listening on configured USBL BA but not responding or acting until received WAKEUP command |
| ST12 | LANDED_BEACON | Landed, acting as an OWTT beacon (i.e. transmitting acoustic communications packets), periodically broadcasting precisely time scheduled acoustic packet USBL_MODE set to SLEEP - listening on configured USBL BA but not responding or acting until received WAKEUP command |
| ST13 | TAKEOFF | Active two-way USBL comms, activation and execution of take-off maneuver USBL_MODE set to ACTIVE |
| ST14 | RECOVERY | Come to surface, on surface, move to recovery congregation site |
| ST15 | RECOVERED | Node recovered and onboard vessel |

TABLE 1-continued

Node States

| State ID | State | Summary |
|---|---|---|
| ST16 | DOCKED | Node returned to containerized node docking station (CNDS) which is described later in the specification |
| ST17 | POST_CHECK | Node running automated system functional post-checks<br>Results written to CC DB |
| ST18 | POST_CHECK_FAILED | Post-check failed - Node requires manual operator intervention<br>Alert issued |
| ST19 | CHARGING_DATA | Node charging<br>Node offloading data to CC DB |

Figure 13:
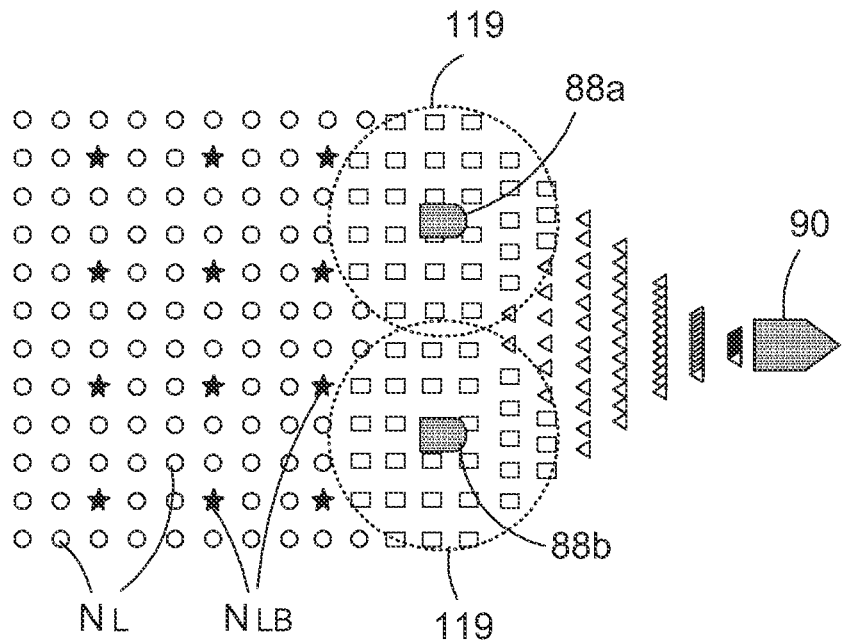
FIG. 13 is a representation showing how nodes in the system may be deployed and initially positioned in accordance with steps in the first embodiment of the disclosed method.
Figure 14:
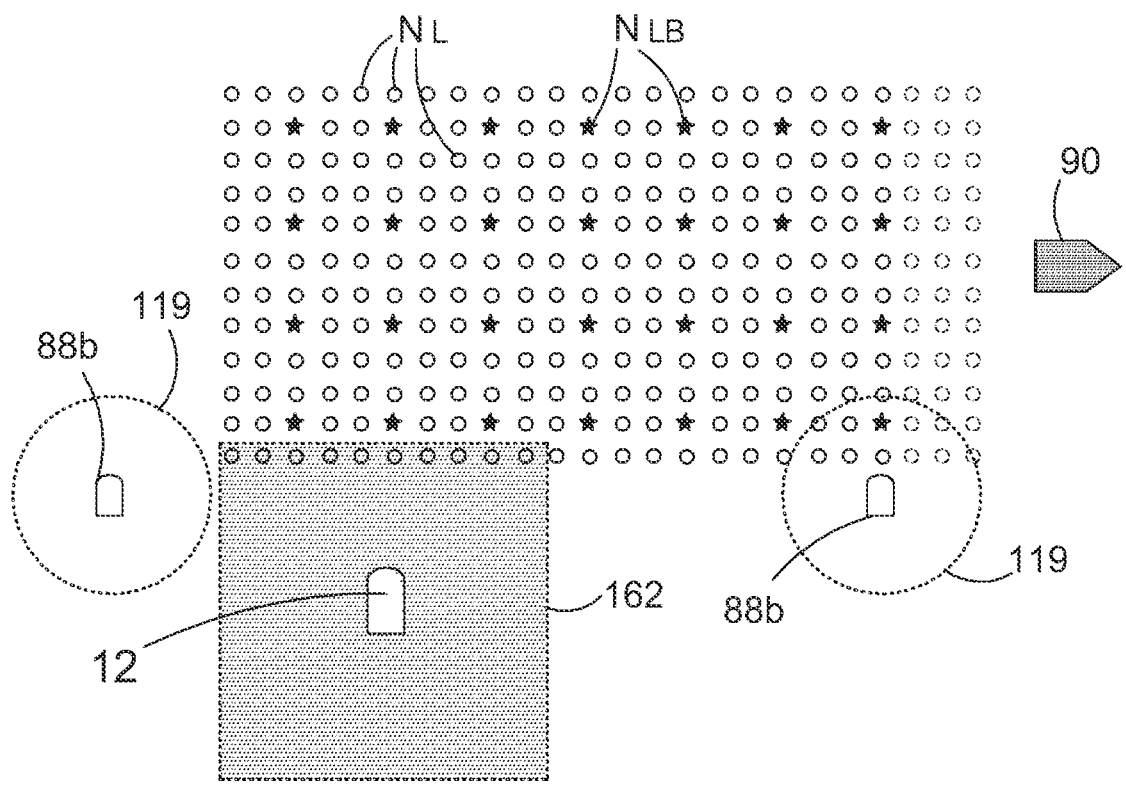
FIG. 14 is a plan view of an embodiment of the disclosed system at the commencement of performing an embodiment of the disclosed method showing the nodes in a landed array and possible starting locations for other marine vessel is used in the system and method.
Figure 15:
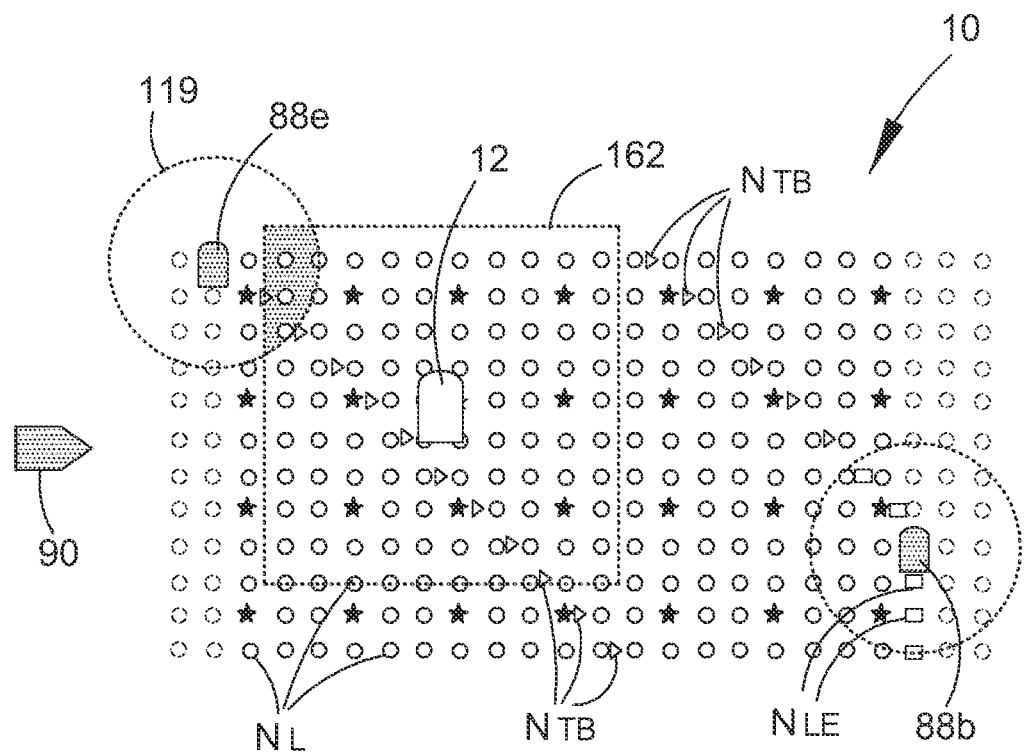
FIG. 15 is a plan view representing how nodes in the system may be repositioning in accordance with steps in the first embodiment of the disclosed method.

FIGS. 10-18b shown in more detail various aspects of the autonomous data acquisition system (ADAS) 10 and associated method 100. In the present embodiment for the purposes of conducting a marine seismic survey the system 10 in addition to incorporating a large number of nodes also includes a variety of equipment and systems that work together. These include the seismic source vessel 12, one or more unmanned surface vessel (USV) 88, the node mothership (NMS) 90 and a communications network 92 via which the surface vessels which include the source vessel 12, NMS 90 and USVs 88 can communicate with each other. With reference to FIG. 15, the NMS 90 has a launch and retrieval system (LARS) 94, one or more containerised node docking systems (CNDS) 96, and a command and control system (CCS) 98.

Containerised Node Docking System (CNDS)

Figure 10A:
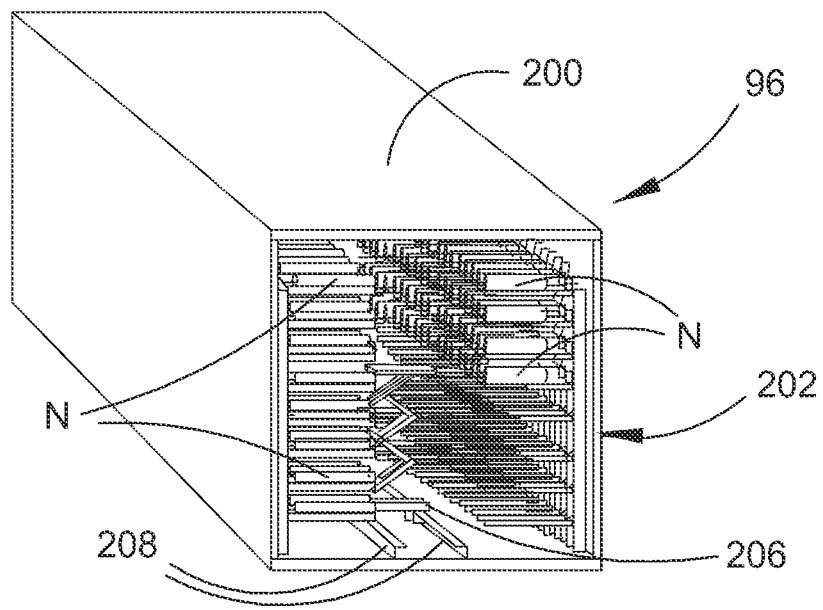
FIG. 10a is a representation in isometric view of a containerised node docking system incorporated in embodiments of the disclosed method and system.
Figure 10B:
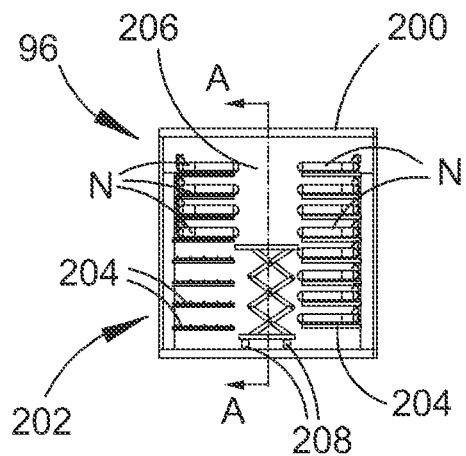
FIG. 10b is a front view of the containerised node docking system shown in FIG. 10a with the one end of an associated container being opened.
Figure 10C:
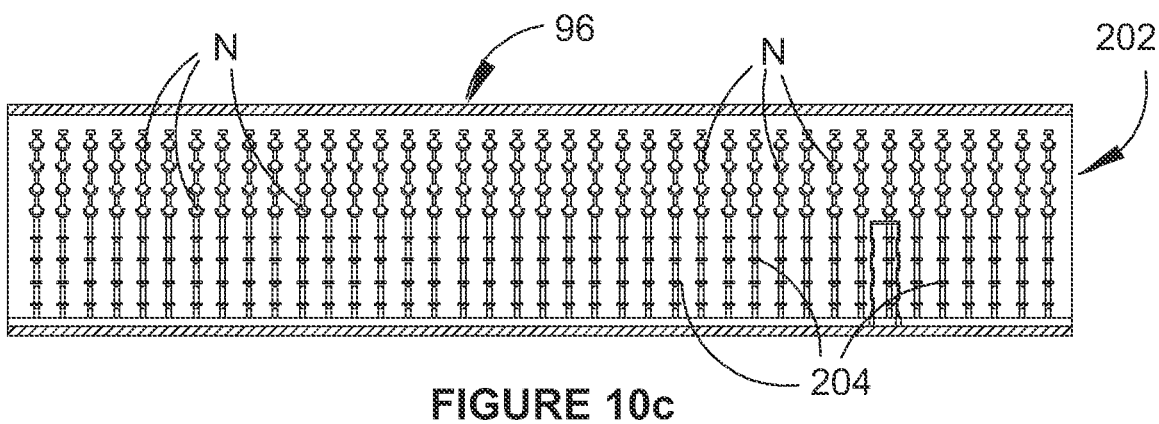
FIG. 10c is a view of section AA of the containerised node docking system shown in FIG. 10b.

With reference to FIGS. 10a-10c each CNDS 96 comprises a container 200 provided with a modular racking and docking system 202, and integrated data offload and power distribution systems. The racking system 202 has a plurality of docking bays 204, one for each node N. The power distribution system has battery charging apparatus available at each of the node docking bays 204, these charging apparatuses may include a physical connector or wireless connection. Additionally, each CNDS 96 has an integrated Wi-Fi communication system for node communication and data offload. A high bandwidth physical ethernet connection is provided to connect the nodes N when docked in the CDNS 96 to the CCS 98 and more particularly it's corresponding server. The CNDSs 96 may also be arranged to enable them to be daisy-chained together for the purposes of power and/or communications connection.

In one example of the CNDS 96 may be based on a standard 40-foot ISO container. At least two variations of the containerised node docking system are possible.

In a fully automated containerised node docking system 96 illustrated in FIGS. 10a-10c the node racking system 202 has a bank of racks on either side internally of the containers 200. An automated node pick up and placement system 206 is housed in a central corridor of the container 200 and can run on corresponding tracks 208. The system 206 operates when, in a launch mode, to take a node N from its dock 204 and place it either adjacent to or onto the launch conveyor 106. The system 206 also operates in a return mode in which it is able to transfer a node N from the return conveyor 108 into an available dock 204 in one of the CNDSs 96. In some embodiments the system 206 is capable of placing a node N onto the conveyor 106 and lifting a node N from the conveyor 108. However, in a less sophisticated embodiment the nodes can be manually transferred from the conveyors 106/108 onto or off of the system 206. The system 206 is controlled by the CCS 98.

In yet a further even less sophisticated embodiment the containerised node docking system 96 may be constructed without the automated node pick up and placement system 206 and arranged for manual transfer of the nodes N into and out of the corresponding containers 200. In such an embodiment the containers 200 may be provided with doors on one of their sides that can be opened and sliding racks or drawers that can be accessed when the doors are opened. The racks/drawers may be provided with multiple docks 204 for housing corresponding nodes. With the manual CNDS each node is manually lifted from and later lifted back into a dock. It is envisaged that the manual CNDS would be able to hold more nodes than the automated CNDS because no space is required for the automated node pick up and placement system.

Launch and Retrieval System (LARS)

Figure 11A:
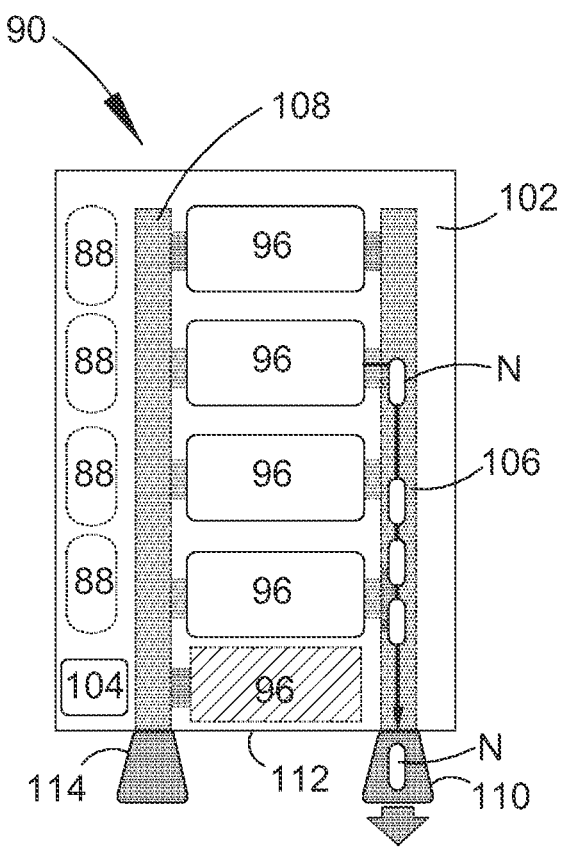
FIG. 11a is a representation of a launch and recovery system incorporated in an embodiment of the disclosed system when launching nodes into the body of water.
Figure 11B:
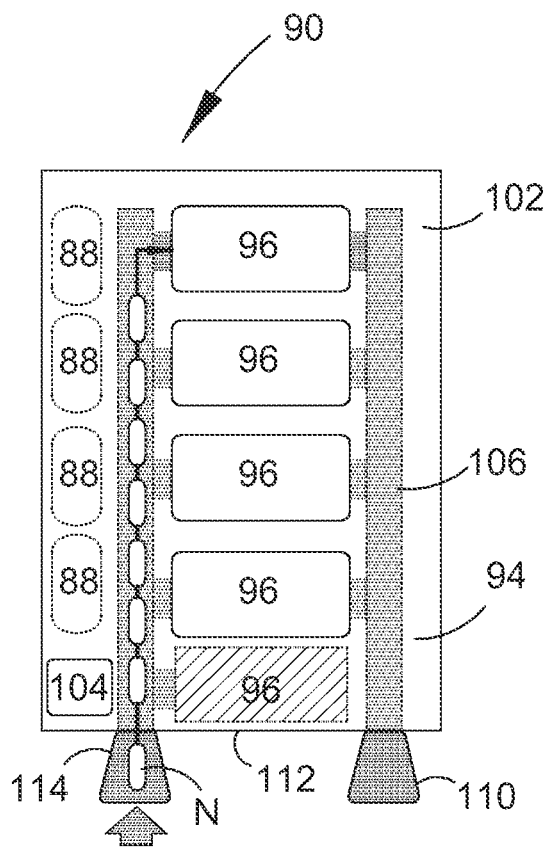
FIG. 11b is a representation of the launch and recovery system shown in FIG. 11b but now when being operated to recover nodes from the body of water.

FIGS. 11a and 11b provide a schematic representation of a portion of a deck 102 of the NMS 90 which includes the node landing and retrieval system (LARS) 94 refer to earlier in this specification. FIG. 11a depicts the LARS 94 when launching the nodes N, while FIG. 11b depicts the LARS 94 when retrieving the nodes N. These Figures also show a plurality of the CNDSs 96 and USVs 88 on the deck 102 together with a crane 104. The LARS includes a launch conveyor 106 which runs past access openings or doors at one end of each CNDS 96, and a return conveyor 108 that runs past respective access openings or doors on an opposite end of each CNDS 96. The launch conveyor 106 carries nodes N to a downwardly inclined launch chute 110 at the stern 112 of the NMS 90. The return conveyor 108 carries nodes N from a recovery chute 114 to one of CNDSs 96.

During launch/deployment the nodes are moved onto the conveyor 106 either manually or mechanically and carried to the launch chute 110 from which they slide sliding down into the water. The launch process is controlled from the CCS 98 so that the nodes are deployed at the correct rate, in the correct sequence and the designated location.

For recovery the nodes are commanded to the surface and congregate at a recovery location, for example location 168 described later in relation to and shown in FIG. 17. From there the nodes are mechanically placed or delivered onto the return chute 114 from which they are carried by the conveyor 108 for loading into dock in one of the CNDSs 96.

The crane 104 may be used to launch and retrieve the USVs 88.

Command and Control System (CCS)

The CCS 98 is a centralised communication, control, monitoring and data management system which includes one or more servers and databases. In this embodiment this is provided on the node mothership 90. The CCS 98 operates over the wireless mesh network 92 paired with acoustic communication via the USVs 88. Some of the capabilities and functionality of the CCS 98 include:

- managing scheduling of survey activities and sending commands to the various system elements
- allowing operators to modify survey plans mid-survey providing flexibility in acquisition managing acquired, downloaded data and preparing output data products for processing and analysis.

The CCS 98 includes visualisation tools such as displays enabling operators to visualise the operation of the system 10 and location and status of the source 12, USVs 88 and the nodes N.

An acoustic doppler current profiler (ADCP) may be installed on the NMS to acquire real time water current velocity profile data. Collected data may be assimilated into a local scale current velocity model within the CCS 98; or alternately used for interpolation of current velocity. This can then be used in the navigation control and scheduling of the USVs and nodes, including guiding the node approach to a target landing location. Other surface assets (i.e. the and USVs 88) may each be instrumented with an ADCP to provide increased area coverage. Such data may also be used by the CCS 98 to estimate node travel time to next location & evaluate flight performance of vehicles.

A multibeam echo sounder (MBES) may be installed on NMS to acquire bathymetric data. From the MBES data the CCS 98 builds a high-resolution bathymetric model of the survey area (either from scratch or to validate/update past datasets). other surface assets (i.e. the and USVs 88) may each be instrumented with a MBES to provide increased area coverage. The resulting bathymetric model can be used to assist in the control the node landing behaviour. In this event the altimeter 72 and corresponding transducer 74 shown in FIG. 8 may not be required on each node, reducing unit cost. Additionally, collected bathymetric data may be used to identify marine hazards such as obstacles and/or steep slopes. This data may be used by the CCS 98 to modify the survey target landing locations to improve reliability/results.

Acoustic Positioning

Acoustic communication and positioning imposes numerous challenges including its inherent limited bandwidth. Embodiments of the present system 10 and method 100 seek to address this by using a combination of different acoustic positioning methods during different phases of survey operations. In one embodiment a first acoustic positioning system may be operable between the surface vessels, e.g. the USVs 88 and the nodes; and a second acoustic positioning system may be operable between respective submerged nodes.

For example, the first acoustic positioning system is a USBL positioning system. This includes USBL transceivers on the USVs 88 and the USBL transducer/modem 60 on the nodes. The USBL positioning is used when a high level of positional accuracy is required, during final approach to target location and landing, either during the initial landing and at subsequent landings following a node repositioning. In this embodiment the second acoustic positioning system may be in the form of an OWTT positioning system. This entails the nodes being arranged to act as OWTT beacons, broadcasting time scheduled acoustic communications packets via their top mounted transducer 62T, and also being arranged to receive the acoustic communications packets via their bottom facing transducer 62B. As previously described the OWTT may be provided by the USBL transducer/modem 60. The landed nodes may act as OWTT beacons broadcasting the acoustic communication packets for the nodes transiting between subsequent seabed locations during mid-survey reposition events.

This contrasts with the systems described in the Background Art which rely on USBL or LBL for all acoustic positioning. USBL is not readily scalable and has a limited range. As a consequence, a large number of surface vessels are required relative to the number of nodes. The use of LBL involves significant effort and thus cost in deploying, calibrating and recovering moored LBL transponder beacons. This is not considered to be viable for large area coverage required for seismic acquisition.

The ability to enable synchronous clock acoustic navigation using OWTT in embodiments of the disclosed system 10 and method 100 is feasible due to the following system attributes:

- All nodes have accurate, stable, low drift clocks 58 and synchronised time.
- All transiting nodes are moving over, or adjacent to a landed array of other nodes.
- The spatial distribution of a set or group of the landed nodes provides a suitable array for OWTT navigation.
- The nodes do not require high positional accuracy for navigation during transit from one side of array to the other.

This may provide several enabling factors to the overall system, which include:

- The degree of accuracy required from navigation systems on board of the node may be reduced. This can provide significant cost saving in the node components as ultra-low-cost inertial measurement units 68 are sufficient. Additionally, the power requirement for the low cost IMU 68 may be reduced, resulting in increased node endurance.
- USBL communications/navigation it is not required for the reposition transit of the nodes—it is used for positioning during the landing of the nodes and during recovery to provide high accuracy positioning; and to provide communications between surface vessels and the nodes during these periods. This reduces the number of USVs 88 needed in the system 10. Additionally, it becomes possible to share available USBL communication addresses between many nodes and may lead to reduced USBL communication usage.

As a consequence of these considerations embodiments of the system 10 and method 100 may incorporate the following features:

- The locations, timeslots and possibly frequency configuration of nodes which are used as OWTT beacons may be defined for entire survey prior to start. This information is stored onboard all nodes prior to deployment
- On landing at beacon location, the node is commanded to act as beacon.
- All node beacon locations and configurations are known by all USV 88, the NMS 90 and other surface vehicles
- Each beacon node broadcasts an acoustic packet on a specified time schedule
- Acoustic packets are received by transiting a node and used to identify the source and calculate range from the source using stored beacon information. Kalman filtering may be used in this process to filter bad ranges and identify possible beacon nodes based on speed thresholds One-way time of flight measurement is made by receiving node.

Once a transiting node receives signals from multiple beacons nodes it can make an estimate of its current location (latency correction is applied using onboard dead reckoned calculations).

Filtering onboard the transiting node for quality assurance of incoming data (i.e. maximum transit speed & previous known position, only use ranges within a certain threshold)

The node updates its 'known' position, adjusts navigation control as required and continues transit towards target location using updated position Acoustic Communication USBL systems have limited number of unique beacon addresses (BAs) available for communication & positioning (this limit differs for different USBL systems) and therefore have limited capacity to scale to a large number of nodes beyond this limit. This presents an issue when attempting to position and communicate with a swarm of nodes several orders of magnitude larger than the limit, as is required in embodiments of the system 10 and method 100. To resolve this issue USBL communication and positioning must be managed using a non-standard approach.

A proposed solution to this which may be incorporated in embodiments of the disclosed system 10 and method 100 is as follows.

Each node is each configured for a defined USBL beacon address (BA) prior to its deployment. This may occur at step 140 of the method 100. Respective groups of nodes are configured for (i.e. to have) the same BAs. However, no two nodes in the same group with the same BA are able to actively communicate over an associated USBL modem at the same time (i.e. during LANDING and TAKEOFF states).

To this end the node USBL transducer/modem 60 has a beacon functionality with two potential states ACTIVE and SLEEP. During the ACTIVE state the node USBL transducer/modem 60 responds to ranging and communication and acts on information received. During the SLEEP state the node USBL transducer/modem 60 is still receiving however does not respond to ranging or communication and does not act on information received. To transition from SLEEP to ACTIVE a wakeup message is sent from the topside USBL system (i.e. from the USV 88 which may initially receive this command from the CCS 98 by way of the surface communications network 92) to the relevant node USBL beacon (modem) address. Additionally, node USBL BA can be configured remotely via acoustic communications as required.

In one embodiment the acoustic communications may be realised by adoption of various strategies with a general aim of producing bandwidth requirements which in broad terms may include the followings:

1. Prior to the start of a survey, defining and storing all potential node target locations in an electronic table. In cases where an operator may want to alter a node target positions during execution of survey all possible/potential locations could be defined. Here each location is assigned an ID, latitude & longitude. If accurate depth at the target locations is available it is included in table, otherwise this is left blank. Before deployment of a node, while it is being configured in step 140 (see FIG. 12) and in a CONFIG state, the entire table of information may be parsed to each node. This allows target locations to be identified using HEX id (i.e. a standard hexadecimal character string) during survey operations, significantly reducing acoustic communication data transfer requirements.
2. The node target location table may also be used to define commanded recovery locations during INITIATE_RECOVERY transition.
3. Transitions and states IDs may be defined by ID. For example, the node states described in the above Table may be defined as corresponding states ST #, i.e. state ID1 may be defined as state ST01. The node transitions from one state to another may be defined as TR #, i.e. with reference to the state diagram in FIG. 9, the node transition from TAKEOFF to RECOVERY may be defined as TR16.
4. All target OWTT beacon location ID & metadata (source time schedule, beacon target location etc.) may be defined prior to survey start and parsed to at least a subset of, but preferably all the nodes during CONFIG state. This data is stored on data storage and/or databases of or otherwise accessible by the controller 32. This information is utilised by transiting nodes in the processing of received OWTT acoustic packets to calculate position.

Method of Acquiring Data

Figure 12:
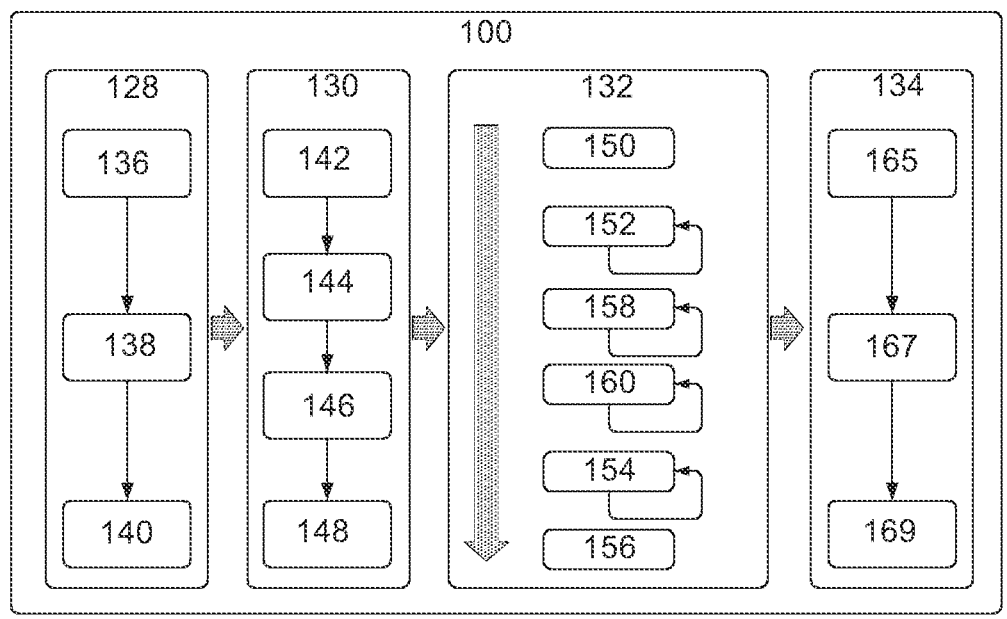
FIG. 12 is flowchart depicting the first embodiment of the disclosed method for acquiring data.

With reference to FIG. 12 the method 100 involves a plurality of process or steps which may be broadly grouped into a pre-deployment process 128, a node deployment process 130, survey and data acquisition process 132, and a node storage and data download process 134.

Node Pre-Deployment

The pre-deployment process 128 involves an initial step 136 of deploying and positioning the vessels required in conducting the survey. In this embodiment the vessels comprise the USVs 88, the source vessel 12 and the NMS 90. In this embodiment two USVs, 88a and 88b (referred to collectively as USVs 88) are used in conducting the seismic survey. The USVs 88 may be carried by and launched from the NMS 90. The USVs 88 navigate to and are held at their respective start locations. It is during this phase that all surface communication checks are performed the CCS 98 and via the communications network 92.

At step 138 an automated pre-survey functional check of the nodes N is performed while the nodes N are on the NMS 90 and more particularly when still housed in their respective CNDS 96. The pre-survey functional check is run from the CCS 98 on-board the NMS 90. A notification indicator on a CCS console and on each dock 204 indicates whether a node N has passed or failed in its pre-survey functional check. During the project process the status of the node is updated to PRE_CHECK.

A node N that has failed the automated remains in its respective bay for manual checking and troubleshooting at the next available opportunity. The state of the failed node is updated to PRECHECK_FAILED.

Next step 140 is performed on the nodes which passed the pre-check. At step 140 the state of the node is updated to CONFIG and the node is loaded with configuration data and survey information while in their respective containers on the NMS 90. The node is queued in a deployment schedule and the state of the node is now updated to ready_to_deploy. This completes the pre-deployment process 128.

Node Deployment

The deployment process/step 130 can now commence. This involves deploying each of the nodes N in the ready_to_deploy state at step 142. On triggering of the deployment step 142 the nodes N are moved from their respective CNDS 96 to the LARS 94 and deployed from the NMS 90.

Once a node N is deployed it enters a DEPLOYED state. The deployment at step 142 occurs while the NMS 90 is slowly moving through the node target deployment/landing sites. That is, while the NMS 90 is in transit the nodes N are being autonomously deployed at scheduled times to predetermined/programmed landing sites.

Immediately after a node N enters the DEPLOYED state it transitions to an INITIAL_TRANSIT state at step 144. The node N is now under water and moving toward its initial target location. At this stage the buoyancy system 16 is operating as described above in relation to FIGS. 7a-7d to propel the node N to its target location. Acoustic communication is established between the node N and a USV 88 (or the NMS 90) and the node N navigates toward its target location using ultrashort baseline (USBL) positioning and communications. When in the vicinity of its target location the node N transitions to a LANDING state and subsequently lands at this target location at step 146.

Upon landing, at step 148 a node N sends a verification signal to the USV 88 that it has successfully landed at the target location. The target landing location ID and the actual landing location, measured by USBL topside unit on the USV 88, are recorded to a CCS database and the node now enters the LANDED state.

The deployment process 130 is repeated until the entire array of nodes N have been deployed and verified as LANDED.

FIG. 13 depicts a snapshot in time of the deployment process 130. Here the NMS 90 is transiting (i.e. sailing) over an array of target landing locations for the nodes N. As the NMS 90 is transiting, nodes N are being deployed from the LARS 94. Nodes N which have been most recently launched from the NMS 90 are shown as triangles and a transiting toward their respective target locations using dead reckoned navigation.

As represented in FIG. 13 during this process the nodes N fan out from the NMS 90. Eventually while transiting, the nodes N establish acoustic communication with the USVs 88 and navigate toward their respective target landing positions. These nodes N are represented by rectangles, being within the USBL communications envelope 119. The nodes N which have landed at their target locations and are now stationary and coupled to the seabed, are represented by black circles. During this process the USVs 88 maintain a substantially constant spacing from each other and from the NMS 90.

When an initial swarm of nodes has been deployed and landed at their target locations the deployment process 130 has been completed.

The survey and data acquisition process 132 can now commence.

Survey and Data Acquisition Process

The landed nodes N form a sensing array for seismic surveying. Prior to the commencement of the survey, and as shown in FIG. 14, the USV 88a is located at a bottom of and at or slightly behind a trailing edge 164 of the node array so as to be a safe distance from the source vessel 12 when the survey commences. The USV 88b is located at a bottom of a leading edge 166 of the node array and is also outside of the shot area 162. FIG. 14 also depicts the source vessel 12 approaching the node array with and each of its in general alignment with the trailing edge 164.

In FIG. 14 all the nodes have landed at their target locations and are represented by either black circles or stars. The landed nodes represented as stars are those nodes which have been configured prior to landing by the CCS 98 to act as OWTT beacons. With reference to FIG. 9, and the above Node State table these nodes are in the state ST12.

The number of landed nodes N is greater than the number of nodes N used at any one time to acquire seismic signals related to the shots fired by the source vessel 12. In the system 10 and method 100 while a group of landed nodes is receiving seismic data, at step 152 other nodes which have previously received seismic data are repositioning themselves in the survey area in order to acquire further seismic data from subsequent shots fired from the source vessel 12. This repositioning is generally in the same manner as described above in relation to FIGS. 1-2. The repositioning, firing, and acquisition of data is continuously repeated until the entire survey is complete.

Figure 16:
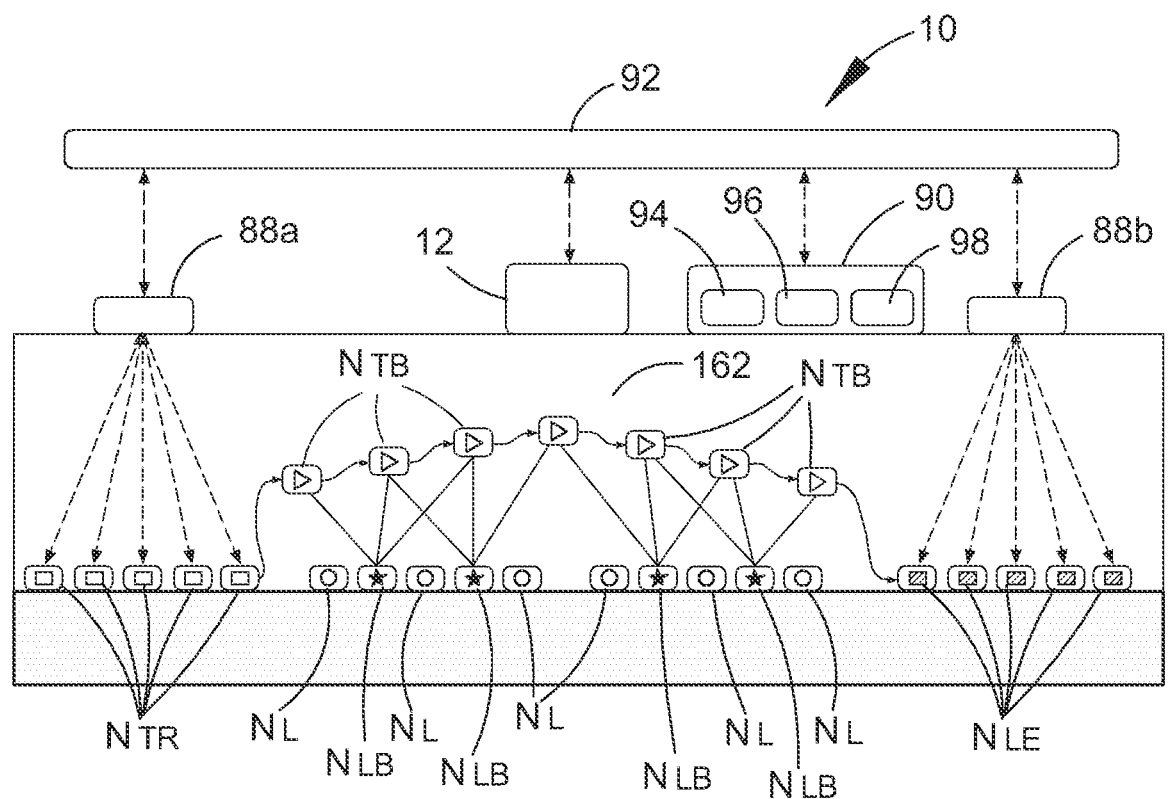
FIG. 16 is a front view of the nodes being repositioned as shown in FIG. 14.

In FIGS. 15 and 16 different nodes N are in different states and can transition between states. In FIG. 15 (and FIGS. 14, 16 and 17) all transiting nodes are designated by a triangle and all landed nodes acting as OWTT beacons are designated by a star.

Additionally, in FIG. 16 the nodes are represented as follows:
- all nodes N are represented by an outer grey rectangle with an inner symbol
- all nodes in USBL communication with USV 88a at the trailing edge 164 have a square with a black perimeter and white interior as their inner symbol and are designated as $N_{TR}$
- all landed nodes within the shot area 162 have either an inner black circle as the inner symbol and are designated as $N_L$, or have a star as their inner symbol and are designated as $N_{LB}$; the nodes $N_{LB}$ are acting as OWTT beacons
- all transiting nodes (i.e. in the TRANSIT state ST09, repositioning between successive landed locations) have a triangle as their inner symbol and are designated as $N_{TB}$
- all nodes in the process of landing or already landed that are outside of the shot area 162 and in USBL communication with the USV 88b at the leading edge 166 have a square with a black perimeter and white interior as their inner symbol and are designated as $N_{LE}$ At the commencement of the survey (i.e. at step 150) with both USVs 88 maintained in positions a safe distance from the source vessel 12, the source vessel 12 commences shooting seismic signals.

Once the shot vessel 12 has traversed beyond a defined offset distance from the trailing edge 164 of the array, commands are sent from the CCS 98 to USV 88a to trigger take off of a first node N along the trailing edge 164 and when doing so provides a location ID relating to the target repositioned landed location of that node N. When the multiple nodes N are within the USBL acoustic communication range envelope 119 of the USV 88a this process can be conducted simultaneously for the multiple nodes N. This is the node repositioning step 152 which is depicted in FIGS. 15 and 16.

The commands sent by the USV 88a includes a WAKEUP command which sets the USBL state of the node to ACTIVE (receiving, responding & acting on received acoustic commands) then commands the nodes N to change state from LANDED to TAKEOFF. The nodes send respective acknowledgement responses to the USV 88a which is communicated via the communication network 92 to and recorded by the CCS 98. The nodes move off the bottom of the seabed by operation of their buoyancy system 16, enter the TRANSIT state and begin transiting to their new locations, on entering the TRANSIT state the node sets its USBL state to SLEEP. The take-off does not involve use of the thruster 18. As the transiting nodes $N_{TB}$ are repositioning the are navigated by way of OWTT navigation receiving acoustic communications packets from the landed nodes acting as beacons $N_{LB}$.

The USV 88a continues along the trailing edge 164 of the array, repeating the command process for each landed node along the trailing edge 164. Thus, a new trailing edge is created along which the USV 88a returns issuing the same commands as when travelling along the previous trailing edge 164. This process continues for the entire survey phase to produce the rolling array of nodes N previously described.

As previously described during the repositioning step 152 the nodes maintain acoustic communications for the purposes of navigation via the "beacon nodes" $N_{LB}$. The landed beacon nodes $N_{LB}$ form an array of OWTT beacons at any one time to facilitate navigate of the transiting nodes $N_{TB}$ from the trailing edge 164 of the array to form a new leading edge 166 of the landed node array using synchronous clock OWTT. The array of beacon nodes is dynamic in terms of the overall survey, i.e. the array moves or rolls with the overall array of nodes. Transiting $N_{TB}$ nodes that are outside the communication range of a USV 88 are provided with navigation information via the beacon nodes $N_{LB}$.

The propulsion for the nodes to transit between respective landed locations during a survey is primarily provided by the buoyancy system 16. As previously described this system operates to adjust the buoyancy of the node between a positive buoyancy and a negative buoyancy to follow a transit path that may contain one or more cycles of rising and diving within the transit envelope TE to traverse the distance between successive landed locations. It should be understood that this may include a single transition between positive buoyancy and negative buoyancy if adequate to traverse the required distance. The repositioning between successive landed locations is done without the nodes needing to surface or otherwise be recovered and redeployed.

Once a transiting node $N_{TB}$ is nearing the leading edge 166, the node changes its USBL state to ACTIVE (receiving, responding & acting on received acoustic commands), when the node is within range of the USV 88b, the USV 88b sends a command to the node commanding the node to change state from TRANIST to LANDING. USBL communication from USV88b now takes over to navigate the node to, and land at, its target location. (Where multiple nodes N are within acoustic communication range of USV88a this process can be conducted simultaneously.) The landing nodes are depicted as a node $N_{LU}$ and land along, and form, the leading edge of the array. During landing the thruster 18 may be operated to assist in manoeuvring the node to its target landed location. The buoyancy system 16 can be operated if required to adjust the contact pressure of the node on the seabed to optimise mechanical coupling for receipt of seismic data.

Once verified by USV 88b that a node has successfully landed at its target location, state of the node is updated to LANDED. This status update is sent to CCS 98 together with the recorded actual landed location and subsequently recorded in the CCS 98 data base.

The USV 88b continues along the leading edge of array, repeating the command process for each node before returning along next line. This process continues for entire survey execution phase 132 on a schedule controlled by the CCS 98.

At a predetermined time before the firing of the last survey shot, a recovery step 154 begins in which the nodes N are recovered back onto the NMS 90. In broad and general terms in this process nodes N which have received data from their last associated survey shot i.e. are outside of the shot offset area, commence their journey to a collection point to be recovered by the NMS 90. This process continues until all the nodes N have been recovered. This will generally be some time after the source vessel 12 has at step 156 fired its last seismic signal.

Figure 17:
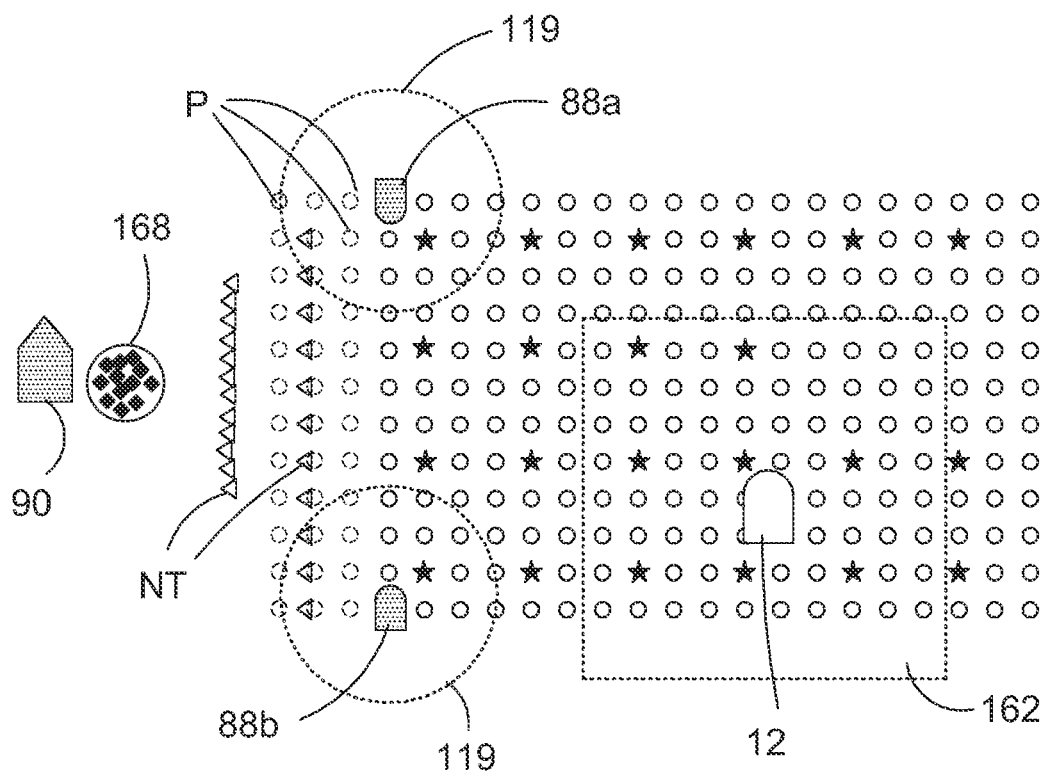
FIG. 17 is a plan view representing how nodes in the system may be recovered from the body of water in accordance with steps in the first embodiment of the disclosed method.

FIG. 17 illustrates a snapshot in time during the recovery step 154. In this Figure unoccupied node positions P are represented as plain circles with white interiors. The unoccupied node positions P are those positions previously occupied by the transiting nodes $N_{TB}$. During the recovery phase the USVs 88 move to be in line with landed nodes to command and provide navigation information to the nodes. The recovery step 154 is described in greater detail below.

Once the source vessel 12 has moved beyond a predetermined offset distance from a trailing edge 164 of the array of landed nodes $N_L/N_{LB}$, the USV 88b moves to join USV 88a on the trailing edge 164. Commands are sent by the CCS 98 to the USVs 88 via network 92 to trigger recovery of the first in line landed nodes $N_L/N_{LB}$ and provide 'recovery location id' of a target recovery location 168 to the nodes $N_L/N_{LB}$. A 'recovery batch id' is also provided to the landed nodes $N_L$. Further where multiple landed nodes $N_L/N_{LB}$ are within acoustic communications range 119 of a USV 88 this process can be conducted sequentially.

This recovery command process may be timed in a way that all nodes in each batch reach the target recovery location 168 at around the same time. This can be achieved by arranging the USVs 88 to move in towards a centre of the line of landed nodes $N_L/N_{LB}$ so that the outside nodes $N_L/N_{LB}$ are triggered to move the first. It is the difference in the travel distance to the recovery location 168 for the outer nodes $N_L/N_{LB}$ in a particular line in comparison to that of the more centrally located nodes $N_L/N_{LB}$ that results in the nodes reaching the recovery location 168 around the same time.

During this operation the location of the USVs 88 relative to the node recovery locations is managed to avoid collision. This includes setting the recovery location 168 to 'behind' trailing edge 164 of the array of nodes so that the transiting nodes $N_T$ move away from the USVs 88.

Batches of nodes come to surface near the recovery location and navigate on the water surface using GPS to target recovery location 168. The nodes congregating as a batch at the location 168. The locations of the surface nodes are monitored by the CCS 98 and once the nodes have congregated, the NMS 90 moves into a recovery position.

The LARS 94 is activated while the NMS 90 holds its position. The orientation of the NMS 90 relative to the batch of surface nodes at location 168 will be dependent on wind, wave & surface current conditions.

The batch of nodes at the water surface at the location 168 begin to move into LARS 94. During this process the nodes may maintain, or otherwise apply, thrust using their thrusters 18 to assist in engagement with and/or collecting by the LARS subsystem.

The survey process 132 may also include two optional steps 158 and 160. At step 158 a random number of nodes N may be recovered for quality control purposes. The recovered nodes have their data checked and analysed to provide a degree of confidence that the acquired seismic data is in accordance with expectations. The nodes to be recovered may be triggered to move from the trailing edge 164 of the array by a signal sent from the CCS 98 to a USV 88 and then to the nodes in question. The nodes congregate at a recovery zone in a manner similar to that described above in relation to the recovery at the end of the survey and are collected by the LARS 94.

The recovered nodes are loaded into the docks 204 of the CNDSs 96, data is offloaded, and the quality control check on the data performed. This opportunity may also be taken to recharge the batteries 34 of the node. Functional pre-checks of the node may be performed similar to that described above in relation to step 138. Assuming the node passes the pre-check, its state is updated to ready_to_deploy the node is then deployed ahead of the leading edge of the array. Subsequently the node is navigated to its target landing position by USV 88*b* using USBL communications/navigation.

At step 160, in cases where survey duration exceeds the node endurance, a mid-survey node battery recharge and data offload can be performed. Scheduling of these operations is controlled by the CCS 98 to minimise additional node requirement. The recovery and redeploy of these nodes may begin well before maximum node endurance is reached. This process is similar to that described above in relation to the quality control check except that offloading of data is not a critical function although the data can of course be optionally performed if desired.

In the event that the number of nodes may require recharging during a survey is about the same as used to perform the quality control check, the two steps 158 and 160 may be merged into one.

Node Storage and Data Recovery

Once the nodes are recovered onto the NMS 90 by the LARS 94 the node storage and data recovery process 134 (shown in FIG. 12) commences. The process 134 involves three steps 165, 167 and 169. During the process 134 the nodes are in communication with and controlled by the CC 98. At step 165 the LARS 94 is operated to return the nodes to an available docking bay in a corresponding CNDS 96 as previously described with reference to FIG. 11*b*.

Next at step 167 the data from the nodes acquired via their sensors 76, is offloaded via the data offload. This may be via the connector 80, or Wi-Fi or by optical communications. Lastly at step 169 post-survey checks may be made of the nodes to verify their functionality and suitability for redeployment. The node is now powered down, i.e. turned OFF. This process is repeated for each batch of nodes until all the nodes in the array are recovered and in their container docking bay.

Second Embodiment—Ocean Survey Application

The first embodiment described above relating to seismic surveys is characterised as such by the provision of seismic sensors in the nodes N and the transiting nature of the nodes between multiple landed locations without surfacing to provide rolling or dynamic bottom coupled seismic sensor array. Communications and navigation systems are incorporated in the first embodiment to enable the dynamic nature of the array that may incorporate hundreds or thousands of nodes and are required to accurately reposition themselves to specific target locations tens or hundreds of times over a several months period.

The second embodiment is in general terms a remotely operated, scaled-down version of the first embodiment, utilising a subset of the full system capability and is envisaged for use in remote ocean surveys. In an ocean survey application, it is envisaged that the swarm of nodes will transit a significant distance (10's to 100's of kilometres) from a deployment location to a survey location, primarily using buoyancy propulsion, periodically surfacing to obtain a GPS fix, to send a status message via satellite communication to an onshore base and to receive any command updates. Then upon reaching the target site, they will dive down to seabed, and optionally perform a landing manoeuvre and couple with the seabed as described in the first embodiment, holding position on the seabed. Nodes will remain landed until either a trigger caused by the passage of time or in response to information collected by an onboard sensor (and associated data processing systems). In some embodiments, some of the required ocean data may be acquired while the node is above the seabed and thus where the node does not land; or indeed while the node is in transit.

The system and method associated with the second embodiment may involve the use of a relatively small number of nodes for example 10-20 rather than the hundreds or thousands of the first embodiment. Also, positional accuracy may not be as important as in the first embodiment to the quality of recorded data.

The nodes may operate completely independently of any surface vessel (i.e. deployed from and retrieved to an onshore location); or, they may be supported by one (or more) long duration USVs 88 or other surface vessel for positioning and acoustic communication.

The nodes may remain on or at a first site for the entire period of the survey; or, move between several survey sites. These sites may be a significant distance apart such as for example 10s to 100s km, at which the above process is repeated.

For these reasons the second embodiment does not require some of the complexity in terms of acoustic communications and navigation of the first embodiment. The substantive differences between the first and second embodiments is summarised below.

Nodes

The first embodiment describes a buoyancy system having a pump system 28 with either separate transit and lift-off pumps which operated different pressures and flowrates, or a single pump. In the second embodiment it is envisaged that the nodes only require a single pump, although the node will still of course operate with a dual pump system.

Instead of or in addition to the seismic sensors 76*a*, the sensors 76*b* are carried by the node N. As previously mentioned the sensors 76*b* include but are not limited to sensors for sensing or measuring characteristics or physical attributes such as but not limited to: water temperature, density, chemical characteristics such as salinity, pH, oxygen content, carbon dioxide content, phosphate content; sulphur content; oceanographic conditions including ocean current velocity and hydrostatic pressure; gravitational field strength; magnetic field strength and orientation; gamma radiation; acoustic characteristics; optical characteristics; bathymetry; and aspects of the benthic zone. The node may also include still and/or video cameras.

System

The system of the second embodiment may differ from that described in relation to the first embodiment as follows:

The source vessel 12 is not required as seismic data is not being acquired.

A node mothership or other surface vessel may or may not be required for node deployment, recovery, maintenance and transport to required measurement locations. This will be dependent on the task at hand and take into account factors such as whether: the sensing locations are within the travel range of the nodes from an onshore base; and/or the projected time for conducting the survey would exceed the endurance of the nodes if operated from an onshore base. In the event that a node mothership or other support vessel is needed it is unlikely to require the infrastructure of the NMS 90. For example, a single and/or scaled down version of the CNDS 96 would be sufficient for the small number of nodes required. Indeed, it may not require a CNDS at all. Instead of the nodes could be stored in cradles on deck, or in a cabinet and manually deployed.

When a mothership or other support vessel is used for deployment of the nodes, it may then return to shore leaving the nodes to acquire their data. Once the data has been acquired a mothership or of the support vessel can make a further trip to recover the nodes.

Method

The method of acquiring data in the second embodiment is simplified in comparison to that of the first embodiment as the nodes will operate in a scaled down swarm size (1 s-10 s) and be controlled remotely/autonomously.

The steps in one embodiment of the method may entail the following:
- if a launching support vessel (e.g. mothership or USV) is used the nodes may be configured while on the support vessel as in the first embodiment;
- launching the nodes;
- enabling the nodes to autonomously fly to a designated target location;
- acquiring the relevant ocean survey data at the measurement location;
- triggering the nodes (for example based on effluxion of time or some other trigger signal) to surface for reposition, remote data transfer or recovery.
- reposition to next location (or repeat landing at first location) etc until completion of survey.

In performing the method, the nodes may use their OWTT capability to position relative to each other. Also, data or other information can be transferred between nodes in the swarm using their acoustic modem 60.

Figure 18A:
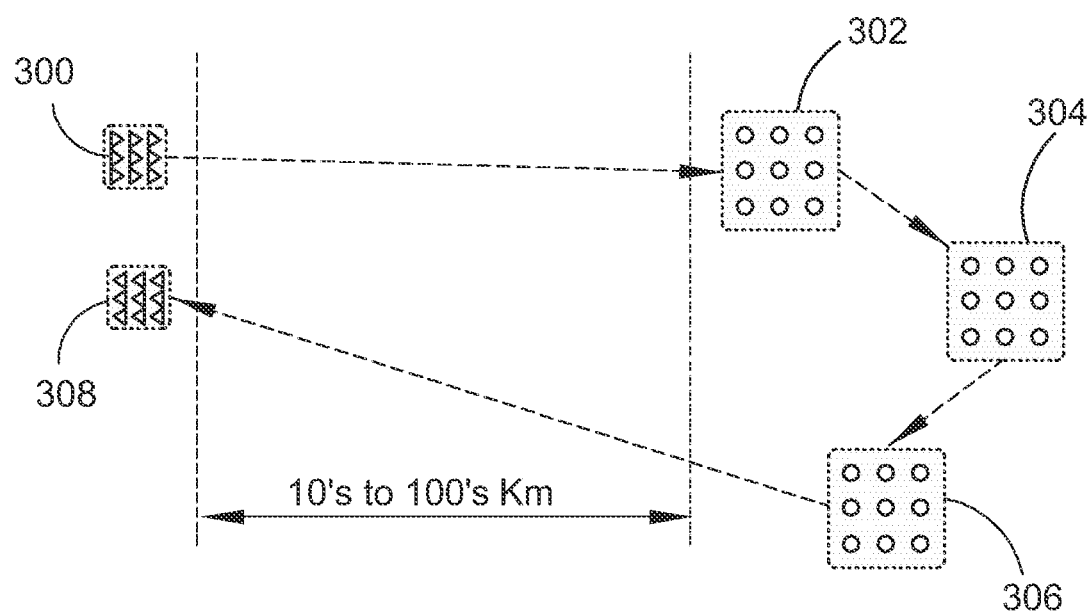
FIG. 18a is a schematic representation of a route of a node operated in accordance with the second embodiment of the disclosed system and method.
Figure 18B:
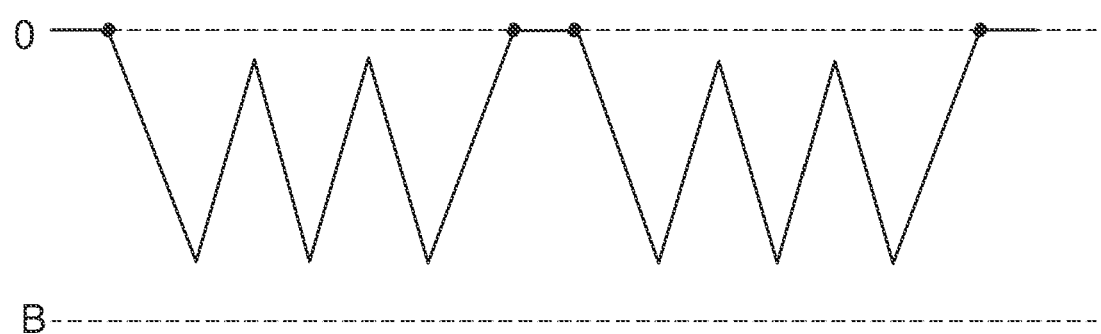
FIG. 18b is a graphical representation of a possible operating cycle of the buoyancy system of the node operated in accordance with the second embodiment.

FIGS. 18*a* and 18*b* illustrate aspects of the second embodiment.

FIG. 18*a* shows an example of a round-trip for a node used for an ocean survey. One or more nodes may be carried to a deployment site 300 on for example a USV or another surface vessel. The nodes are deployed at the site 300 and may travel using their buoyancy propulsion system described above in relation to the first embodiment to a first survey site 302. The first survey site 302 may be up to tens or hundreds of kilometres away from the site 300. At the site 302 the nodes land and acquire the desired ocean data using the sensors 76*b*.

The nodes N subsequently reposition to a second and a third survey site 304, 306 respectively to acquire ocean data. Once ocean data has been acquired from the designated sites the node(s) transit to a recovery site 308. The recovery site and node may be the same as or different to the deployment site 300.

As previously mentioned, the nodes N are triggered to move between various sites by way of a trigger signal, such as the effluxion of time. Between moving from site to site the nodes may surface to acquire GPS data to assist in navigating to a subsequent site. If and when surfaced, one or more of the nodes may also transfer data for example via satellite to a control centre. In this regard data from a plurality of the nodes may be transferred to a designated data transfer node which transfers all the data from all the nodes when surfaced.

When the second embodiment incorporates a plurality of nodes the nodes may navigate without surfacing between survey sites using one-way transit time positioning as described above in relation to the first embodiment.

As shown in FIG. 18*b* the buoyancy of a transiting node may be controlled or modulated by the buoyancy system 16 in the same manner as described in relation to the first embodiment causing the node to traverse within a transit envelope between successive landed locations. However, in a departure from the seismic survey embodiment, in order to updated position data and transfer acquired data the transit path may include one or more nodes surfacing for a period of time.

The approach to landing and control of buoyancy during this process is the same as shown in and described with in relation to FIG. 7*d*.

Now that embodiments of the nodes, system and method have been described it should be appreciated that the nodes, system and method may be embodied in many other forms.

For example, the array formed by the landed nodes N need not be rectangular and can include other shapes irrespective of their ability to tessellate. Moreover, the array shape and pattern can change from location to location to account for bathymetry and/or structures (e.g. platforms, jackets, pipelines etc) disposed in a survey area.

In the example described above in FIGS. 1*a* and 1*b* of the dynamic rolling nature of the arrays, the nodes are shown as moving to "like for like" locations from one array to the next. However, this is for ease of description only and it is not essential for such concordance in node location. As the nodes are dynamically repositionable they may take different relative positions from one array to another. This will be the case when one array covers an area of different size or shape of another, or use a different number of nodes. Also, as mentioned above the system 10 may comprise a plurality of backup, redundant or reserve nodes which may transit from location to location but are not activated to provide readings of physical characteristics or parameters unless and until called upon to take the place of a node which has become disabled, or augment measurement/reading density. Additionally, or alternately, further nodes may be carried by the command vehicle and deployed to join a current swarm of nodes.

Embodiments of the nodes may also be arranged to enable data transfer between each other. In this way several nodes may communicate with another node that comes to the surface to act as a gateway for transfer of data to a surface vessel or shore-based system.

In the claims which follow and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features of the nodes, system and method as disclosed herein.

What is claimed is:

1. A submersible autonomous data acquisition node comprising a buoyancy system enabling variation of the node buoyancy between positive buoyancy and negative buoyancy, the buoyancy system including:
   - at least one inflatable external bladder;
   - at least one internal reservoir containing a liquid;
   - a pump system having at least one pump operable to transfer liquid from the reservoir to the at least one inflatable external bladder to thereby increase total node buoyancy;

a bleed path operable to selectively allow the liquid to flow from the at least one inflatable external bladder to the reservoir by action of a difference in pressure acting on liquid in the reservoir and in the at least one inflatable external bladder, to thereby decrease total node buoyancy; and a controller to control the pump system and the bleed path to achieve a desired buoyancy, wherein the controller is configured to vary node buoyancy between a positive buoyancy and a negative buoyancy during transit between first and second landed submarine locations on the seabed so that the buoyancy system is operable as a buoyancy propulsion system, and wherein the controller is configured upon the node landing at a seabed location to increase the negative buoyancy of the node beyond that required to dive to the seabed location to thereby increase contact pressure between the node and the seabed.

2. The node according to claim 1, wherein the controller is arranged to vary node buoyancy between a positive buoyancy and a negative buoyancy to maintain the node within a transit envelope below the water surface and above a seabed during a transit phase for a node traversing from a first submarine location to a second submarine location.

3. The node according to claim 1, wherein the controller is operable to vary node buoyancy between the positive and negative buoyancy in a manner wherein a node traverses within the transit envelope along an oscillating path.

4. The node according to claim 3, wherein the node is configured when landed on the seabed in manner wherein the negative buoyancy of the node is substantially evenly distributed over contact locations between the node and the seabed.

5. The node according to claim 1, wherein the reservoir includes a pneumatic region separated from a hydraulic region containing the liquid, and wherein the pneumatic region is at a negative pressure with respect to atmospheric or hydrostatic pressure acting on the at least one inflatable external bladder.

6. The node according to claim 1, wherein the bleed path includes a one-way valve operable to enable fluid to flow only in a direction from the at least one external inflatable bladder to the reservoir, the valve being switchable between an opened state wherein liquid is able to flow from the at least one external inflatable bladder to the reservoir, and a closed state in which the liquid is blocked from flowing through the bleed path.

7. The node according to claim 1, wherein the pump system comprises a single pump capable of pumping liquid from the reservoir to the at least one inflatable external bladder.

8. The node according to claim 1, wherein the pump system comprises a transit pump and a lift-off pump, wherein the transit pump is arranged to pump liquid between the reservoir and the bladder at a first flow rate and first pressure, and the lander buoyancy system comprises a lander pump which pumps liquid between the reservoir and the bladder and a second flow rate and second pressure wherein the first flow rate is higher than the second flow rate and the second pressure is higher than the first pressure.

9. The node according to claim 1, wherein the node is selectively operable to broadcast acoustic communications packets and to receive and process acoustic communications packets to facilitate one-way travel time positioning when the node is repositioning between two submarine locations.

10. The node according to claim 9, wherein the node comprises a top mounted transducer for broadcasting the acoustic communications packets and a downward facing receiver for receiving acoustic communications packets transmitted by another node.

11. The node according to claim 1, wherein the node is arranged to communicate with a surface marine vessel using USBL, SBL or SSBL acoustic communications.

12. The node according to claim 1, further comprising a surface communications system enabling a node to communicate when on a water surface with the or another surface vessel and/or a land-based station.

13. The node according to claim 1, further comprising a GPS receiver.

14. The node according to claim 1, further comprising a thruster arranged to automatically operate when speed of a node derived from operation of the buoyancy propulsion system is less than a threshold speed.

15. The node according to claim 1, further comprising one or more seismic sensors supported on the node for acquiring seismic data.

16. The node according to claim 15, further comprising one or more other sensors.

17. The node according to claim 1, further comprising one or more sensors capable of sensing one or more oceanographic characteristics or properties.

18. A marine data acquisition system comprising a plurality of nodes: wherein each node of the plurality of nodes comprises:

a buoyancy system enabling variation of the node buoyancy between positive buoyancy and negative buoyancy, the buoyancy system including:

at least one inflatable external bladder;

at least one internal reservoir containing a liquid, a pump system having at least one pump operable to transfer liquid from the reservoir to the at least one inflatable external bladder to thereby increase total node buoyancy;

a bleed path operable to selectively allow the liquid to flow from the at least one inflatable external bladder to the reservoir by action of a difference in pressure acting on liquid in the reservoir and in the at least one inflatable external bladder, to thereby decrease total node buoyancy; and a controller to control the pump system and the bleed path to achieve a desired buoyancy, and wherein the controller is configured to vary node buoyancy between a positive buoyancy and a negative buoyancy during transit between first and second landed submarine locations on the seabed so that the buoyancy system is operable as a buoyancy propulsion system, and wherein the controller is configured upon the node landing at a seabed location to increase the negative buoyancy of the node beyond that required to dive to the seabed location to thereby increase contact pressure between the node and the seabed.

* * * * *